(12) United States Patent
Gaiser

(10) Patent No.: US 7,854,876 B2
(45) Date of Patent: Dec. 21, 2010

(54) APPARATUS AND METHODS FOR MODULAR PREFORM MOLD SYSTEM

(75) Inventor: Karin S. Gaiser, Dayton, OH (US)

(73) Assignee: EcoVision Technologies, LLC, Dayton, OH (US)

(*) Notice: Subject to any disclaimer, the term of this patent is extended or adjusted under 35 U.S.C. 154(b) by 535 days.

(21) Appl. No.: 11/829,326

(22) Filed: Jul. 27, 2007

(65) Prior Publication Data

US 2008/0290561 A1 Nov. 27, 2008

Related U.S. Application Data

(60) Provisional application No. 60/940,309, filed on May 25, 2007.

(51) Int. Cl.
*B29C 45/10* (2006.01)
(52) U.S. Cl. .................. 264/297.2; 425/190; 425/191; 425/192 R; 425/572
(58) Field of Classification Search ............. 264/297.2, 264/39; 425/DIG. 239, 190, 191, 192 R, 425/562, 572, 588, 185, DIG. 247
See application file for complete search history.

(56) References Cited

U.S. PATENT DOCUMENTS

| | | | |
|---|---|---|---|
| 1,408,796 A | | 3/1922 | Beardsley et al. |
| 3,871,611 A | * | 3/1975 | Taketa .................... 249/102 |
| 4,061,705 A | | 12/1977 | Marcus |
| 4,202,522 A | | 5/1980 | Hanas et al. |
| 4,219,323 A | | 8/1980 | Bright et al. |
| 4,268,240 A | | 5/1981 | Rees et al. |
| 4,382,760 A | | 5/1983 | Wiatt et al. |
| 4,395,222 A | | 7/1983 | Gaiser et al. |
| 4,412,806 A | | 11/1983 | Gaiser et al. |
| 4,432,720 A | | 2/1984 | Wiatt et al. |
| 4,435,146 A | | 3/1984 | Wiatt et al. |
| 4,487,568 A | | 12/1984 | Wiatt et al. |
| 4,786,455 A | | 11/1988 | Krishnakumar et al. |
| 4,836,767 A | | 6/1989 | Schad et al. |
| 4,867,668 A | * | 9/1989 | Miyairi .................. 425/192 R |
| 5,147,663 A | | 9/1992 | Trakas |

(Continued)

FOREIGN PATENT DOCUMENTS

WO  PCT/NL/05/000732  *  4/2006

*Primary Examiner*—Yogendra N Gupta
*Assistant Examiner*—Emmanuel S Luk
(74) *Attorney, Agent, or Firm*—Dinsmore & Shohl LLP

(57) ABSTRACT

Apparatus and methods for a preform mold system include multiple preform core side modules having preform mold cores, a core side clamp plate connectable to a moving platen of an injection mold machine and operable to receive the preform core modules, multiple preform cavity side modules having preform mold cavities, each of the preform cavity side modules operable to matingly engage a respective core side module to form multiple preform molds having a respective preform design, and multiple ejector housing assemblies for connecting the core side modules to an ejector platen of the mold machine, each of the ejector housing assemblies corresponding to a respective core side module. The preform mold system may also include a manifold and valve gate assembly connectable to a stationary platen of an injection mold machine and operable to receive the cavity side modules and place the mold cavities in fluid communication with an injector of the mold machine to control the injection of fluidized plastic in a uniform flow into the preform molds, simultaneously.

20 Claims, 33 Drawing Sheets

U.S. PATENT DOCUMENTS

| | | |
|---|---|---|
| 5,240,402 A | 8/1993 | Ingram |
| 5,282,733 A * | 2/1994 | Noritake et al. ............. 425/183 |
| 5,533,882 A | 7/1996 | Gessner et al. |
| 5,536,164 A | 7/1996 | Brun, Jr. et al. |
| 5,595,771 A | 1/1997 | Foltuz et al. |
| 5,645,865 A | 7/1997 | Schad et al. |
| 5,653,934 A | 8/1997 | Brun, Jr. et al. |
| 5,731,014 A | 3/1998 | Travaglini |
| 5,738,149 A | 4/1998 | Brun, Jr. et al. |
| 5,773,038 A * | 6/1998 | Hettinga ..................... 425/145 |
| 5,824,249 A | 10/1998 | Leitch et al. |
| 5,840,350 A | 11/1998 | Salemi |
| 5,863,485 A | 1/1999 | Groleau |
| 6,082,991 A | 7/2000 | Rozenberg |
| 6,123,891 A | 9/2000 | De Tonnac |
| 6,220,850 B1 | 4/2001 | Catoen et al. |
| 6,328,552 B1 * | 12/2001 | Hendrickson et al. ....... 425/188 |
| 6,355,197 B1 | 3/2002 | Lausenhammer et al. |
| 6,375,890 B1 | 4/2002 | Salemi |
| D460,467 S | 7/2002 | Gross |
| D460,766 S | 7/2002 | Gross |
| D460,976 S | 7/2002 | Gross |
| D460,977 S | 7/2002 | Gross |
| 6,537,053 B1 | 3/2003 | Watkins |
| 6,540,499 B2 * | 4/2003 | Schneider ................... 425/190 |
| 6,713,013 B2 | 3/2004 | Wunderlich |
| 6,726,465 B2 | 4/2004 | Groleau |
| 6,749,779 B2 | 6/2004 | Soane et al. |
| 6,887,418 B2 | 5/2005 | Olaru et al. |
| 6,896,505 B2 | 5/2005 | Towery et al. |
| 6,936,198 B2 | 8/2005 | Duringer |
| 6,994,810 B2 | 2/2006 | Hahn et al. |
| 7,037,103 B2 | 5/2006 | Niewels |
| 2002/0102320 A1 | 8/2002 | Hahn et al. |
| 2002/0105113 A1 | 8/2002 | Wright et al. |
| 2003/0173718 A1 | 9/2003 | Wunderlich |
| 2004/0001901 A1 * | 1/2004 | Towery et al. .............. 425/190 |
| 2004/0076703 A1 | 4/2004 | Saulle |
| 2004/0084807 A1 * | 5/2004 | Bischer et al. ........... 264/328.7 |
| 2006/0073235 A1 * | 4/2006 | Ringer, Sr. ................... 425/556 |
| 2006/0159793 A1 | 7/2006 | Hahn et al. |
| 2006/0269649 A1 | 11/2006 | Ciccone |
| 2006/0290034 A1 | 12/2006 | Sideris |
| 2009/0121387 A1 * | 5/2009 | Hoogland ................ 264/297.2 |

* cited by examiner

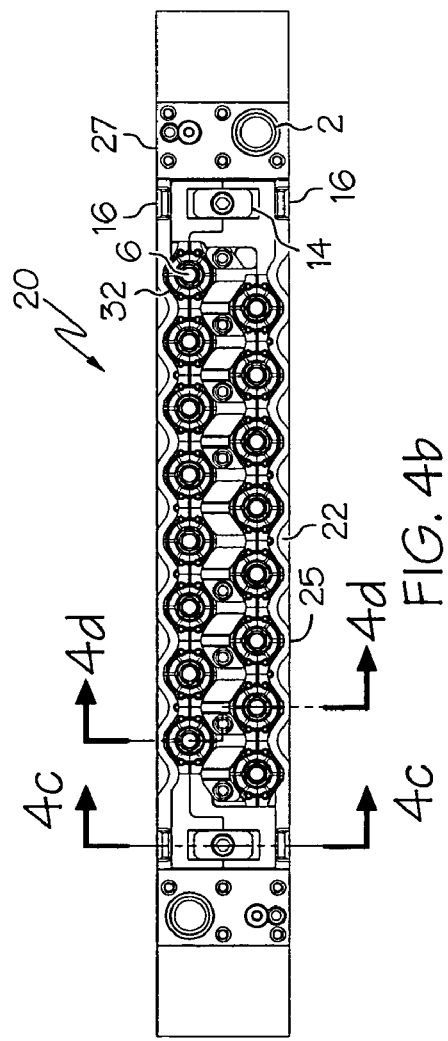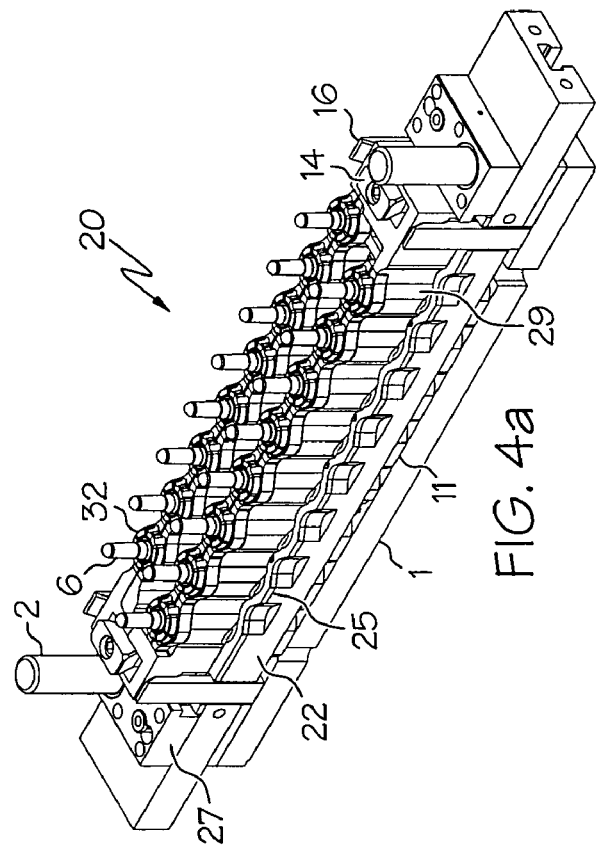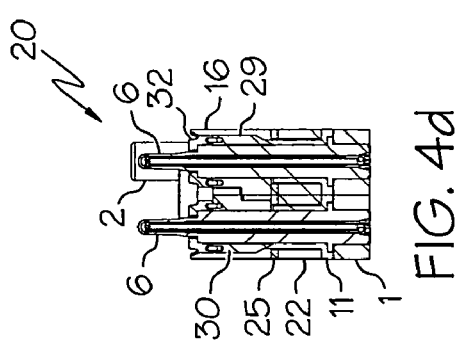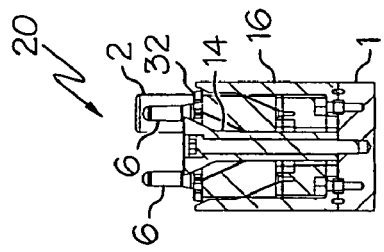

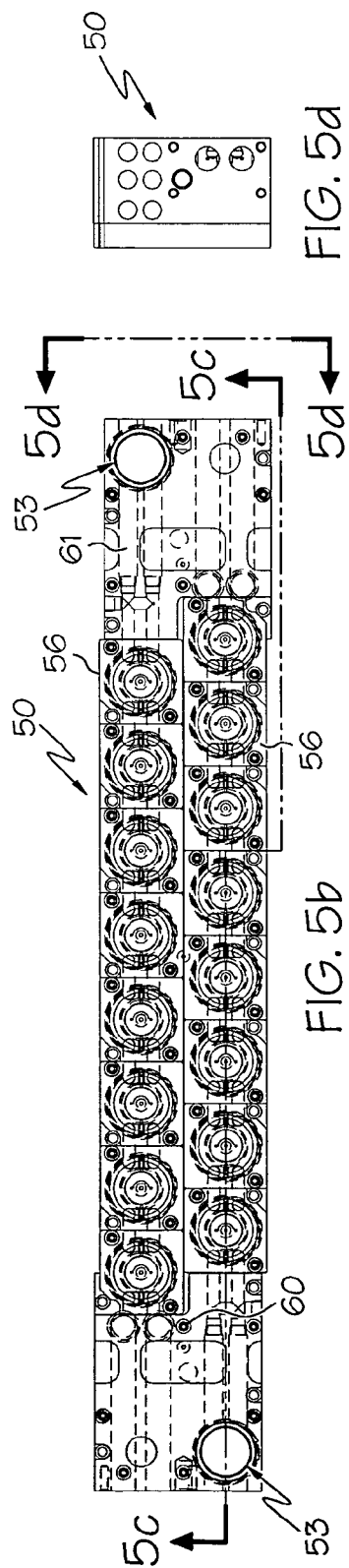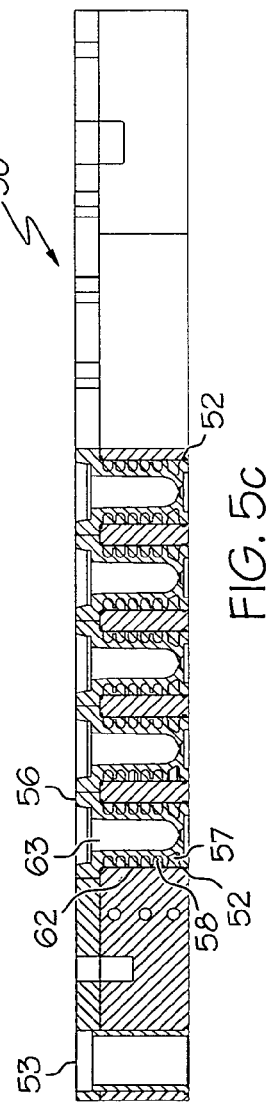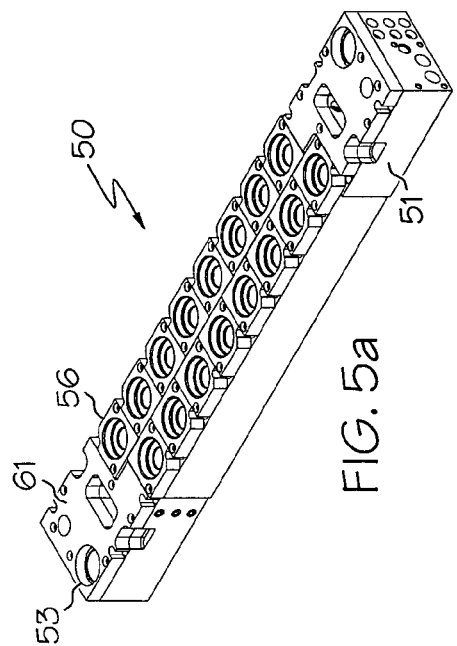

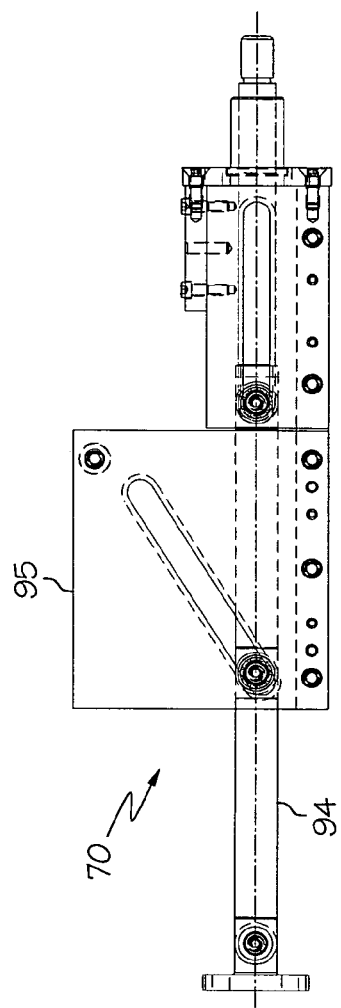
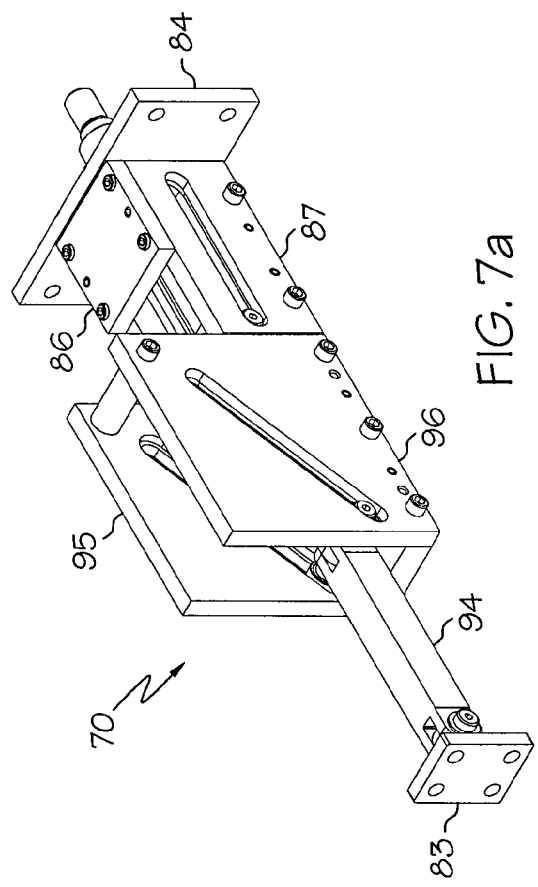
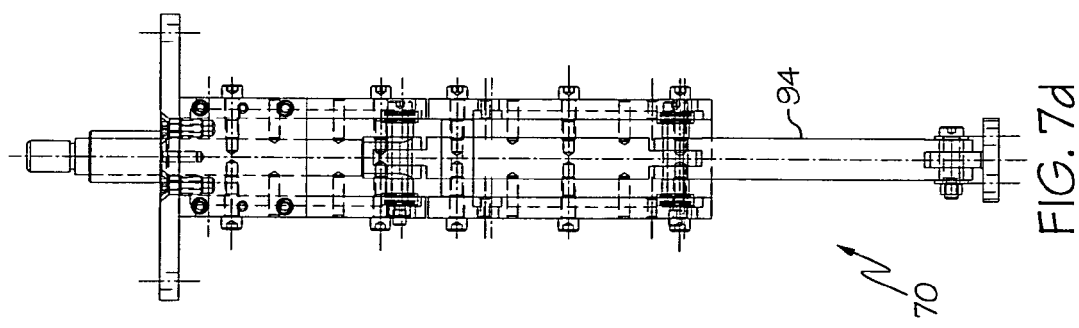

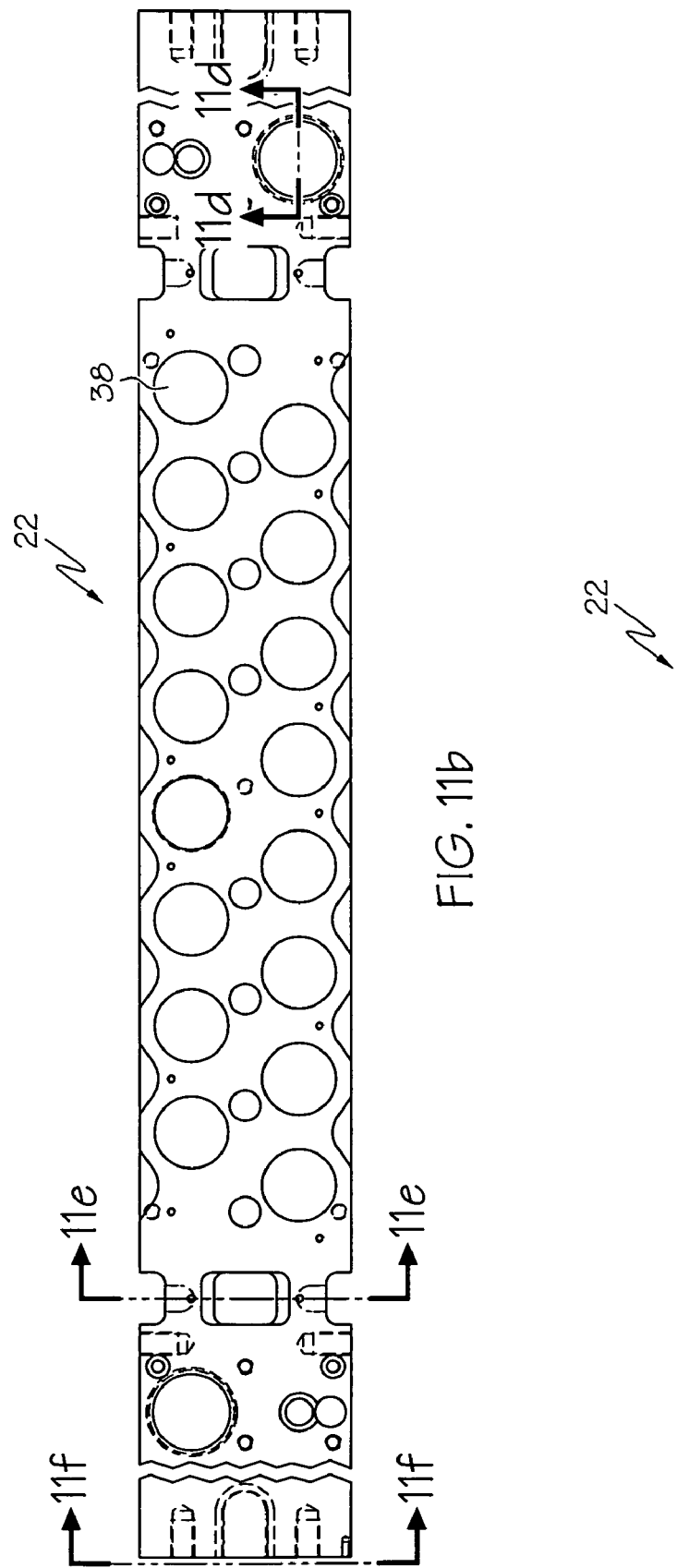
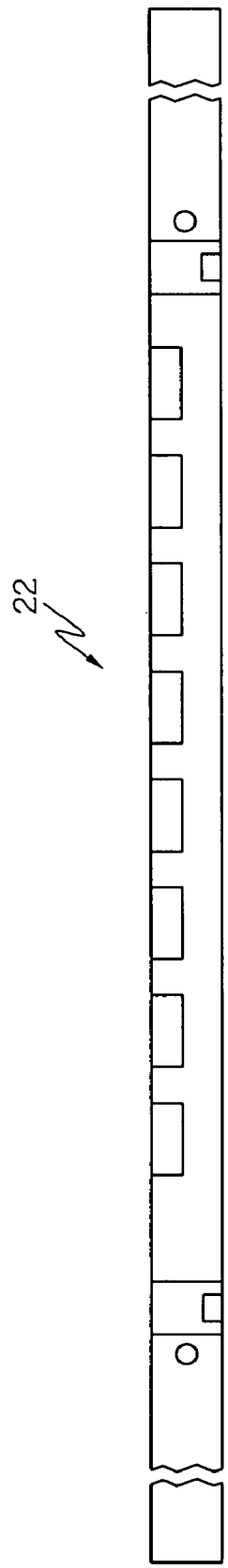
FIG. 11b
FIG. 11c

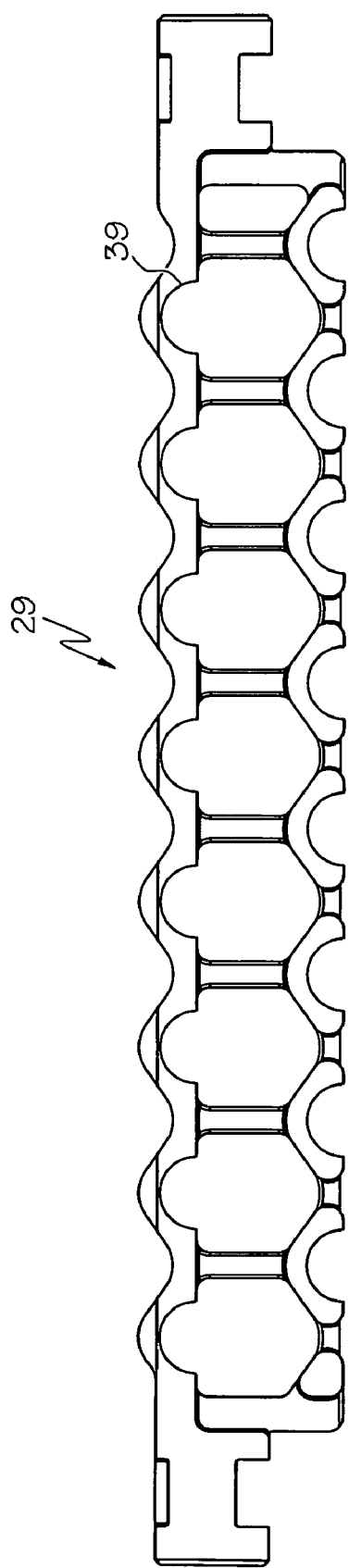
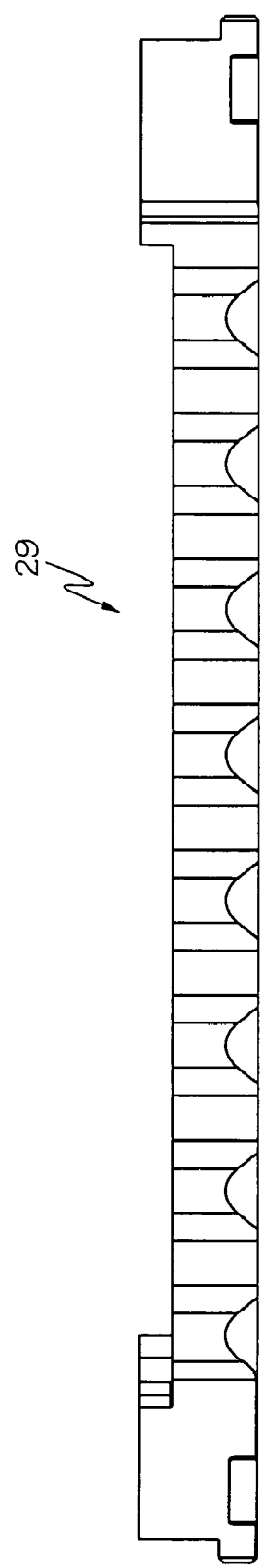
FIG. 13a
FIG. 13b

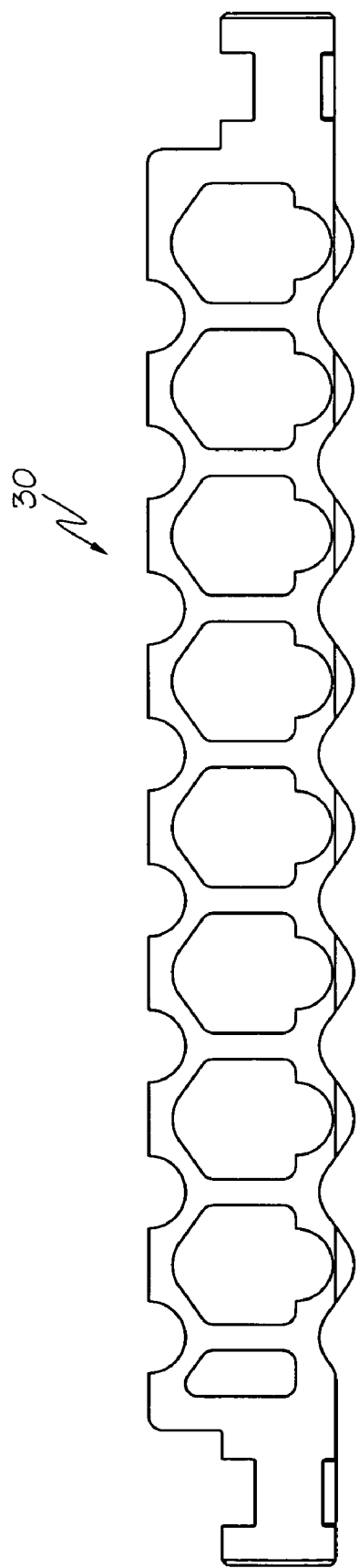
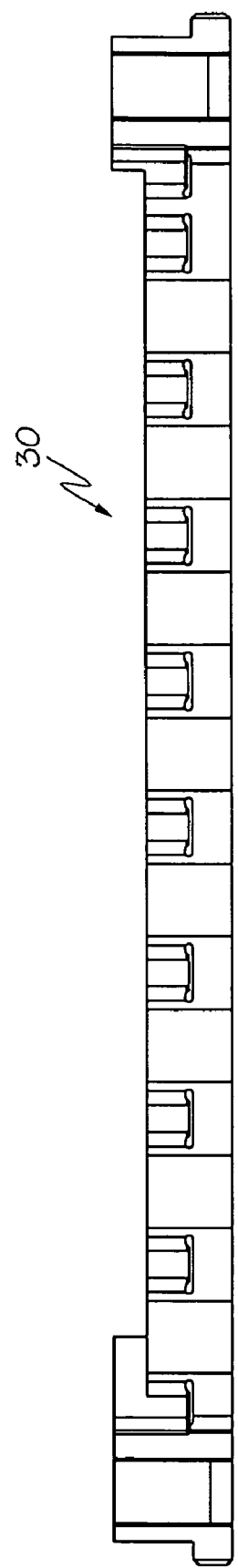
FIG. 14a
FIG. 14b

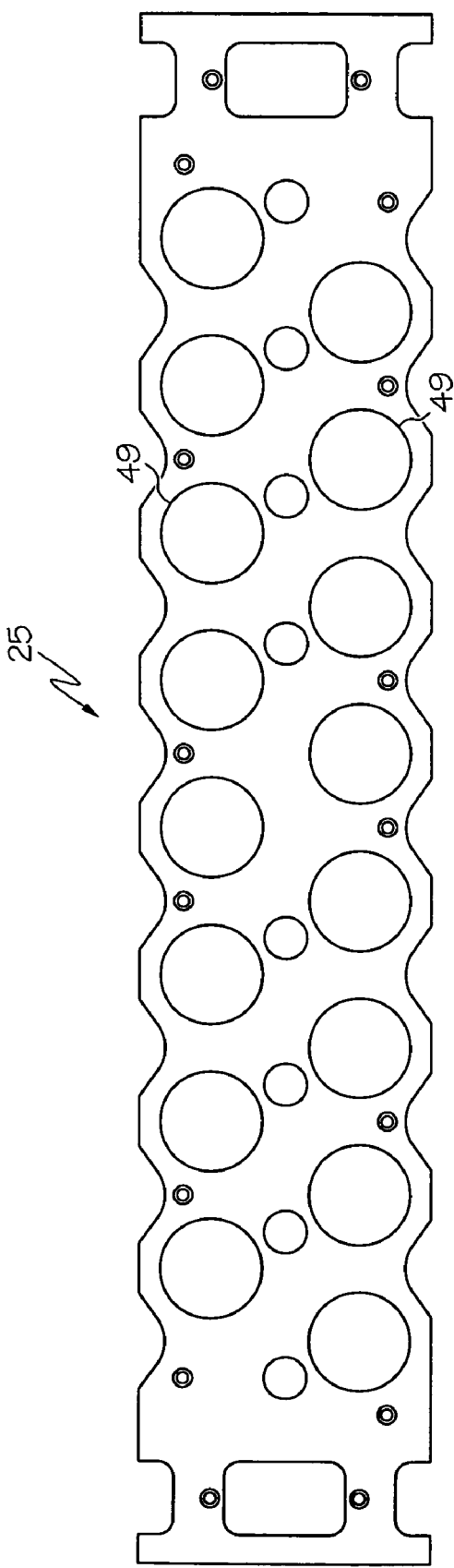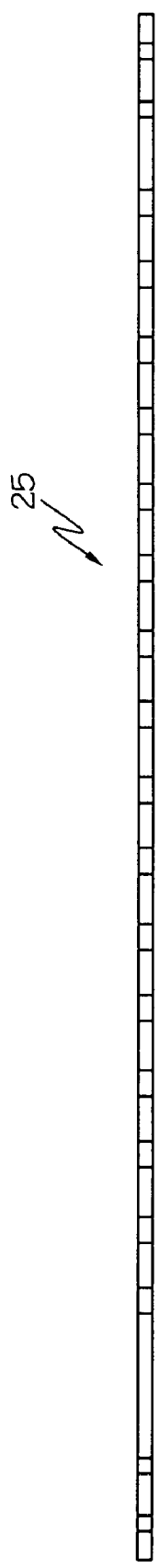
FIG. 18a
FIG. 18b

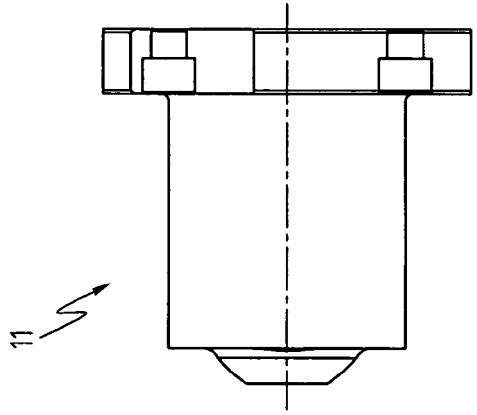
FIG. 20b
FIG. 20e
FIG. 20d
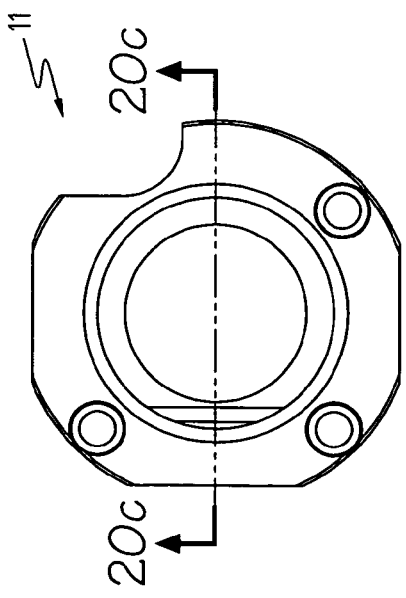
FIG. 20a
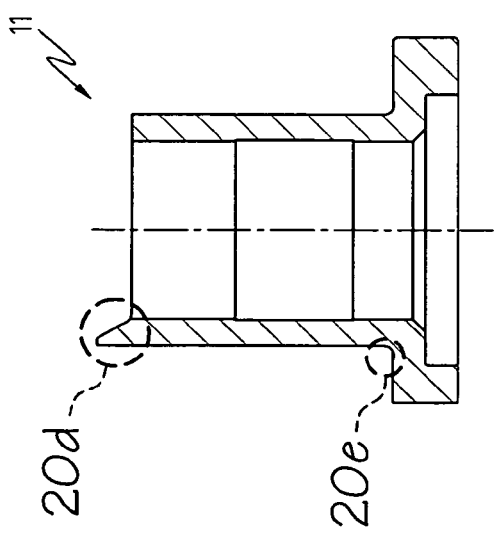
FIG. 20c

APPARATUS AND METHODS FOR MODULAR PREFORM MOLD SYSTEM

CROSS REFERENCE TO RELATED APPLICATIONS

This application in a non-provisional of U.S. Application Ser. No. 60/940,309 filed May 25, 2007 entitled System and Method of Mobile Manufacturing, which is herein incorporated by reference in its entirety.

FIELD OF THE INVENTION

The present invention generally relates to apparatus and methods for injection molding preforms. More particularly, the present invention relates to apparatus and methods for modular preform mold system.

BACKGROUND OF THE INVENTION

The injection mold machines are known. These injection mold machines are used to injection mold a variety of products and parts using fluidized plastic. The injection mold machine may use a variety of plastics to form the injection molded products and parts. One exemplary product formed using an injection molding process is a bottle preform or parison.

SUMMARY OF THE INVENTION

Accordingly, the present invention is intended to address and obviate problems and shortcomings and otherwise improve previous preform mold systems, injection mold machines, and methods regarding the same.

In one exemplary embodiment of the present invention, a modular preform mold system comprises a plurality of preform core side modules having a plurality of preform mold cores, a core side clamp plate connectable to a moving platen of an injection mold machine and operable to receive the plurality of preform core modules, a plurality of preform cavity side modules having a plurality of preform mold cavities disposed therein, a plurality of ejector housing assemblies for connecting the plurality of core side modules to an ejector platen of the injection mold machine, and a manifold and valve gate assembly connectable to a stationary platen of an injection mold machine and operable to receive the plurality of preform cavity modules and place the plurality of preform mold cavities in fluid communication with an injector of the injection mold machine. Also, each one of the plurality of preform cavity side modules corresponding to and operable to mating engage a respective one of the plurality of core side modules to form a plurality of preform molds having a respective preform design, and each one of the plurality of ejector housing assemblies corresponding to a respective one of the plurality of core side modules. In addition, the manifold and valve gate assembly is operable to control the injection of fluidized plastic in a uniform flow into the plurality of preform molds in fluid communication with the manifold and valve gate assembly. Also, the plurality of ejector housing assemblies are operable to eject one or more different sized preforms from the plurality of preform molds.

In another exemplary embodiment of the present invention, a modular preform mold system comprises a first core side module comprising a plurality of preform mold cores, a second core side module comprising a plurality of preform mold cores, a clamp plate for attaching to a moving platen of an injection mold machine and operable to receive both the first and second core side modules, individually or simultaneously, a first cavity side module for connecting to a manifold and valve gate system, a second cavity side module for connecting to the manifold and valve gate system, a first ejector housing assembly for connecting the first preform mold stack-up module to an ejector platen and operable to eject a plurality of first preforms from the plurality of first preform molds, and a second ejector housing assembly for connecting the second preform mold stack-up module to an ejector platen and operable to eject a plurality of second preforms from the plurality of second preform molds. The first cavity side module comprises a plurality of preform mold cavities and the first core side module and first cavity side module are operable to matingly engage one another to form a first preform mold stack-up module comprising a plurality of first preform molds having a first preform design, and the second cavity side module comprises a plurality of preform mold cavities and the second core side module and second cavity side module are operable to matingly engage one another to form a second preform mold stack-up module comprising a plurality of second preform molds having a second preform design. The first and second ejector housing assemblies are operable to eject the respective first and second preforms.

In one exemplary embodiment of a method of the present invention, the method includes modifying a single preform injection mold machine in order to enable the injection mold machine to form an adjustable number of preforms and preform designs. This method comprises the steps of attaching a first clamp plate to a moving platen of a single injection mold machine, the first clamp plate is operable to receive from one to six preform core modules, individually or simultaneously, providing a plurality of preform core side modules, each of the plurality of core side modules connectable to the clamp plate and having a plurality of mold cores, and providing a plurality of preform cavity side modules corresponding to respective ones of the plurality of preform core side modules, each of the cavity side modules connectable to a manifold and valve gate assembly and having a plurality of mold cavities, wherein the method is operable to injection mold from one to six different preform designs on the single injection mold machine simultaneously.

BRIEF DESCRIPTION OF THE FIGURES

The following detailed description of exemplary embodiments of the present invention can be best understood when read in conjunction with the following drawings, where like structure is indicated with like reference numerals and in which:

FIG. 1b is a side elevational view of the core side of the preform mold system and the injection mold machine of FIG. 1a;

FIG. 1c is a front view of the core side of the preform mold system and the injection mold machine of FIG. 1a;

FIG. 2b is a side elevational view of the cavity side of the preform mold system connected to the stationary platen of FIG. 2a;

FIG. 2c is a front view of the cavity side of the preform mold system connected to the stationary platen of FIG. 2a;

FIG. 4a is a perspective view of an exemplary embodiment of a core side module of the preform mold system according to the present invention;

FIG. 4b is a top plan view of the core side module of FIG. 4a;

FIG. 4c is a cross sectional view of the core side module taken along A-A of FIG. 4b;

FIG. 4d is a cross sectional view of the core side module taken along B-B of FIG. 4b;

FIG. 5a is a perspective view of an exemplary embodiment of a cavity side module of the preform mold system according to the present invention;

FIG. 5b is a top plan view of the cavity side module of FIG. 5a;

FIG. 5c is a cross sectional view of the cavity side module taken along A-A of FIG. 5b;

FIG. 5d is a cross sectional view of the cavity side module taken along B-B of FIG. 5b;

FIG. 6b is a cross sectional view of the preform mold stack-up taken along A-A of FIG. 6a;

FIG. 7a is a perspective view of an exemplary embodiment of an ejector housing assembly according to the present invention;

FIG. 7b is an exploded view of the ejector housing assembly of FIG. 7a;

FIG. 7c is a side elevational of the ejection housing assembly of FIG. 7a;

FIG. 7d is a top plan view of the ejection housing assembly of FIG. 7a;

FIG. 8b is a side elevational of the cavity portion of FIG. 8a;

FIG. 8c is a top plan view of the cavity portion of FIG. 8a;

FIG. 8d is a bottom plan view of the cavity portion of FIG. 8a;

FIG. 9b is a bottom plan view of the thread split of FIG. 9a;

FIG. 9c is a side elevational of the thread split of FIG. 9a;

FIG. 9d is a top plan view of the thread split of FIG. 9a;

FIG. 10a is a top plan view of an exemplary embodiment of a cavity plate of the cavity side module of FIG. 5a;

FIG. 10b is a bottom plan view of the cavity plate of FIG. 10a;

FIG. 10c is a detail view of the cavity plate taken at A of FIG. 10a;

FIG. 10d is a detail view of the cavity plate taken along B-B of FIG. 10a;

FIG. 10e is a detail view of the cavity plate taken along C-C of FIG. 10a;

FIG. 11a is a perspective view of an exemplary embodiment of an ejector plate of the core side module of FIG. 4a;

FIG. 11b is a top plan view of the ejector plate of FIG. 11a;

FIG. 11c is a side elevational view of the ejector plate of FIG. 11a;

FIG. 12a is a perspective view of an exemplary embodiment of a core plate of the core side module of FIG. 4a;

FIG. 12b is a top plan view of the core plate of FIG. 12a;

FIG. 12c is a side elevational view of the core plate of FIG. 12a;

FIG. 13a is a top plan view of an exemplary embodiment of a left carrier plate of the core side module of FIG. 4a;

FIG. 13b is a side elevational view of the left carrier plate of FIG. 13a;

FIG. 13c is a bottom plan view of the left carrier plate of FIG. 13a;

FIG. 14a is a top plan view of an exemplary embodiment of a right carrier plate of the core side module of FIG. 4a;

FIG. 14b is a side elevational view of the right carrier plate of FIG. 14a;

FIG. 14c is a bottom plan view of the right carrier plate of FIG. 14a;

FIG. 15a is a top plan view of an exemplary embodiment of a first half section of the clamp plate of FIG. 1;

FIG. 15b is a cross section view of the first half section of the clamp plate taken along A-A of FIG. 15a;

FIG. 15c is a cross section view of the first half section of the clamp plate taken along C-C FIG. 15a;

FIG. 18a is a top plan view of an exemplary embodiment of a wear plate of the core side module of FIG. 4a;

FIG. 18b is a side elevational view of the wear plate of FIG. 18a;

FIG. 19a is a top plan view of an exemplary embodiment of a gib of the core side module of FIG. 4a;

FIG. 19b is a side elevational view of the gib of FIG. 19a;

FIG. 19c is a front view of the gib of FIG. 19a;

FIG. 20a is top plan view of an exemplary embodiment of a core sleeve of the core side module of FIG. 4a;

FIG. 20b is a side elevational view of the core sleeve of 20a;

FIG. 20c is a cross sectional view of the core sleeve taken along A-A of FIG. 20a;

FIG. 20d is a detail of the core sleeve taken at B of FIG. 20c;

FIG. 20e is a detail of the core sleeve taken at C of FIG. 20c;

FIG. 21a is top plan view of an exemplary embodiment of a filler plate of the cavity side module of FIG. 5a;

FIG. 21b is a front view of the filler plate of 21a; and

FIG. 21c is a side elevational view of the filler plate of FIG. 21a.

Figure 1A:
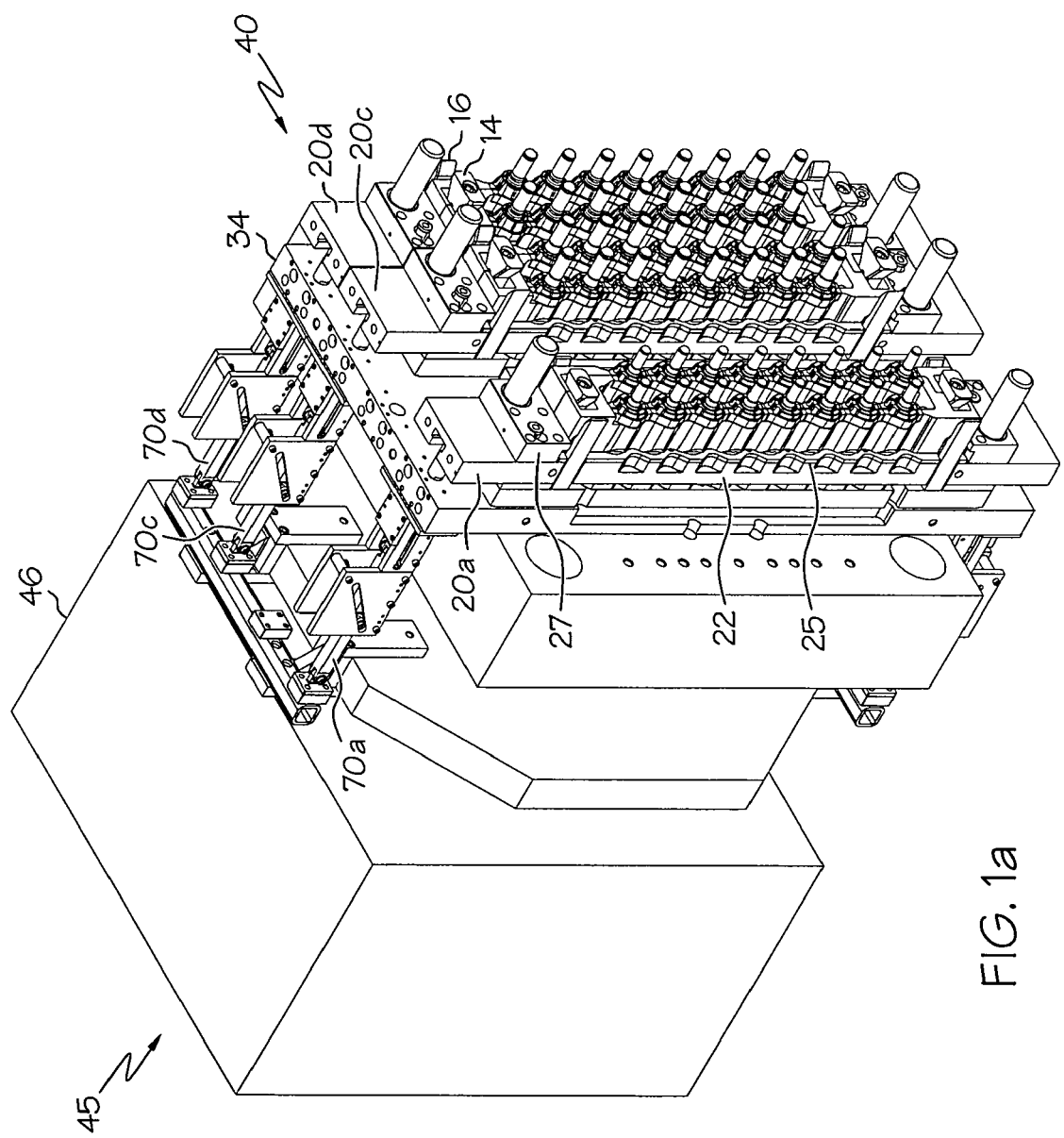
FIG. 1a is a perspective view of an exemplary embodiment of a core side of a preform mold system according to the present invention connected to a core side of an injection mold machine.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present invention generally relates to apparatus and methods for injection molding. More particularly, the present invention relates to apparatus and methods for a preform mold system that comprises a modular preform mold system, enabling flexible, low-cost, high volume, highly adaptable production capabilities (capable of manufacturing a variety of preform sizes, shapes, and numbers, simultaneously or sequentially). The present invention may eliminate the need for the traditional large capital investment expenditures on multiple injection mold machines and/or systems. The complete system offers the end-user (e.g., customer) quality manufactured preforms/parisons (the "products") matched to the unique user's production requirements.

As used herein, the terms 'preform' and 'parison' mean a test tube shaped part produced by injection mold systems, as known to one of ordinary skill in the art, in a first step of a two-stage injection molding and blow molding process used to produce bottles or containers. The injection molding of a preform/parison may be performed in an injection mold machine as known to one of ordinary skill in the art. In the preform, the bottle-cap threads are already molded into place, and the body of the tube is significantly thicker, as it will be inflated into its final shape in the second step using stretch-blow molding. In a second process, the preforms are heated rapidly and then inflated against a two-part mold to form them into the final shape of the bottle or container. In some applications, preforms (uninflated bottles) may be used as containers.

Preform design, as used herein, is defined as a specific shape, size, and/or finish of a preform.

Due to its modularity and flexibility, the preform mold system of the present invention reduces and/or eliminates the need for second injection mold machines for molding preforms having a different size, shape, and/or finish (design) simultaneously or without requiring mold change-outs. Thus, the preform mold system reduces or eliminates added capital investment, unused production capacity, and stranded investment. Also, the preform mold system permits the injection mold machine to efficiently, cost effectively, and quickly adapt and/or change to the ever changing production requirements of the end-user and the market. In one exemplary embodiment of the preform mold system (i.e., mold) of the present invention, the preform mold system may operate in conjunction with or be retrofitted to a single injection mold machine to simultaneously produce a plurality of preforms (i.e., products) having a multitude of preform designs ("sizes, shapes, and/or finishes") on this single injection mold machine.

Referring to FIGS. 1 thru 21, an exemplary embodiment of a preform mold system of the present invention is generally shown as 10. Preform mold system 10 generally comprises a core side 40 (e.g., FIGS. 1, 3, and 4) and a corresponding cavity side 100 (e.g., FIGS. 2 and 5). The preform mold system 10 of the present invention may include multiple preform core side modules 20 (e.g., a first core side module 20a, a second core side module 20b, a third core side module 20c, a fourth core side module 20d), multiple cavity side modules 50 (e.g., a first cavity side module 50a, a second cavity side module 50b, a third cavity side module 50c, a fourth cavity side module 50d) corresponding to the respective core side modules 20, a core side clamp plate 34 operable to receive and connect to one or more of core side modules 20, wherein the multiple core side modules 20 and the respective multiple cavity side modules 50 are designed and/or operable to matingly engage one another to form multiple preform mold stack-up modules having multiple preform molds 67. Also, preform mold system 10 may, optionally, include a manifold and valve gate assembly 111 operable to receive and connect to one or more of cavity side modules 50 and to control and direct the injection of fluidized plastic into each preform mold 67 disposed within each mold stack-up module of the present invention that is actually connected to clamp plate 34 and manifold and valve gate assembly 111.

Also, preform mold system 10 may comprise an ejector housing assembly 70 (e.g., a first ejector housing assembly 70a, a second ejector housing assembly (not shown), a third ejector housing assembly 70c, a fourth ejector housing assembly 70d) for each the core side module 20 (e.g., 20a, 20b, 20c, 20d). Each ejector housing assembly 70 connects between core side clamp plate 34 and an ejector platen 42 of a core side 45 of an injection mold machine and connects to each core side module 20a, 20b, 20c, 20d.

Figure 1C:
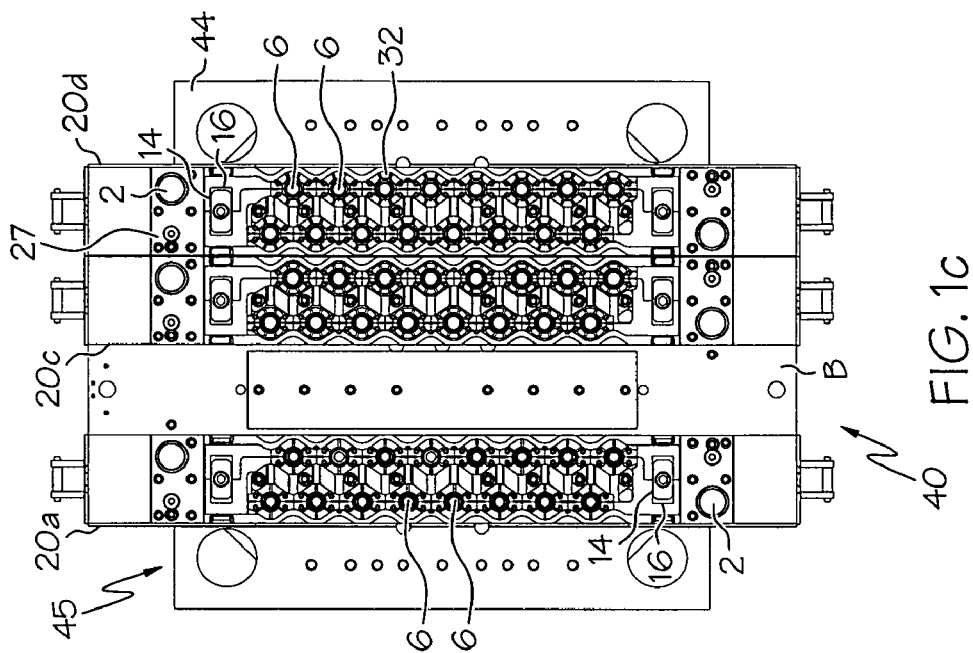
Figure 1B:
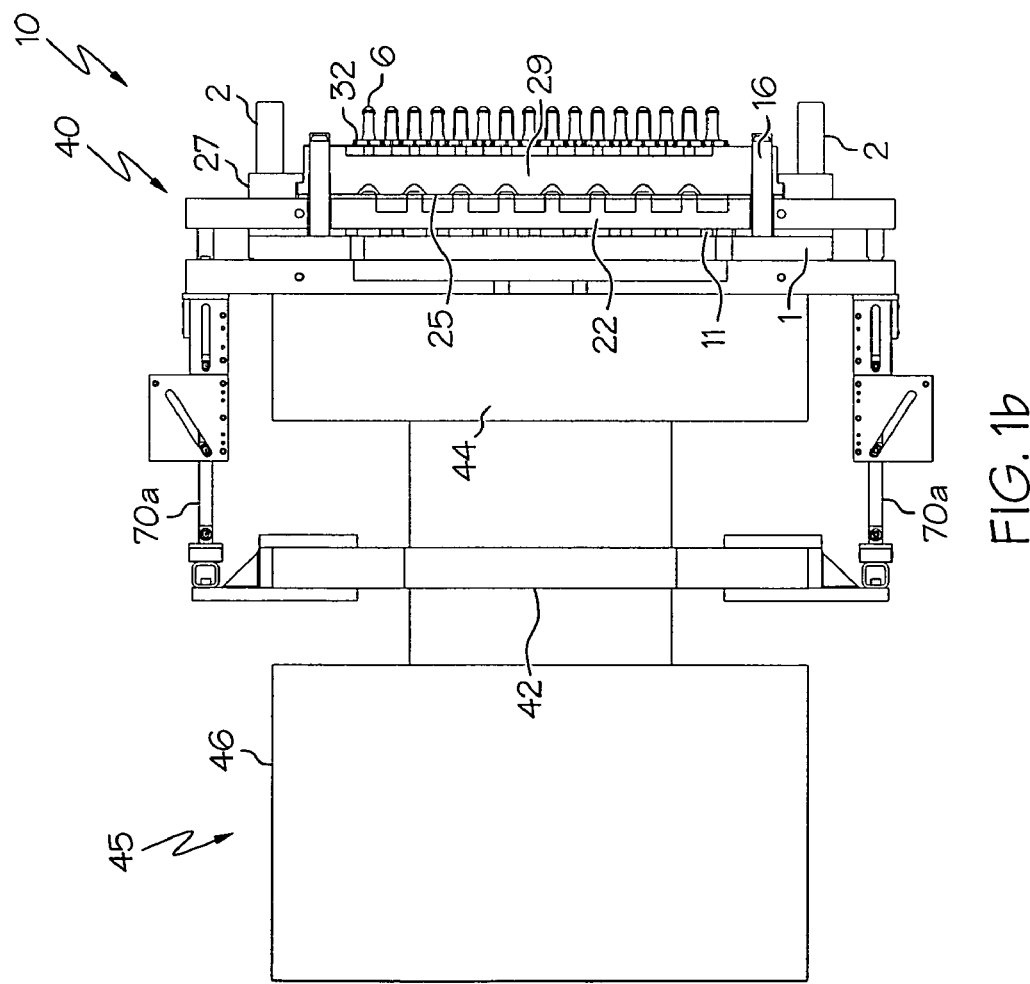
Figure 2A:
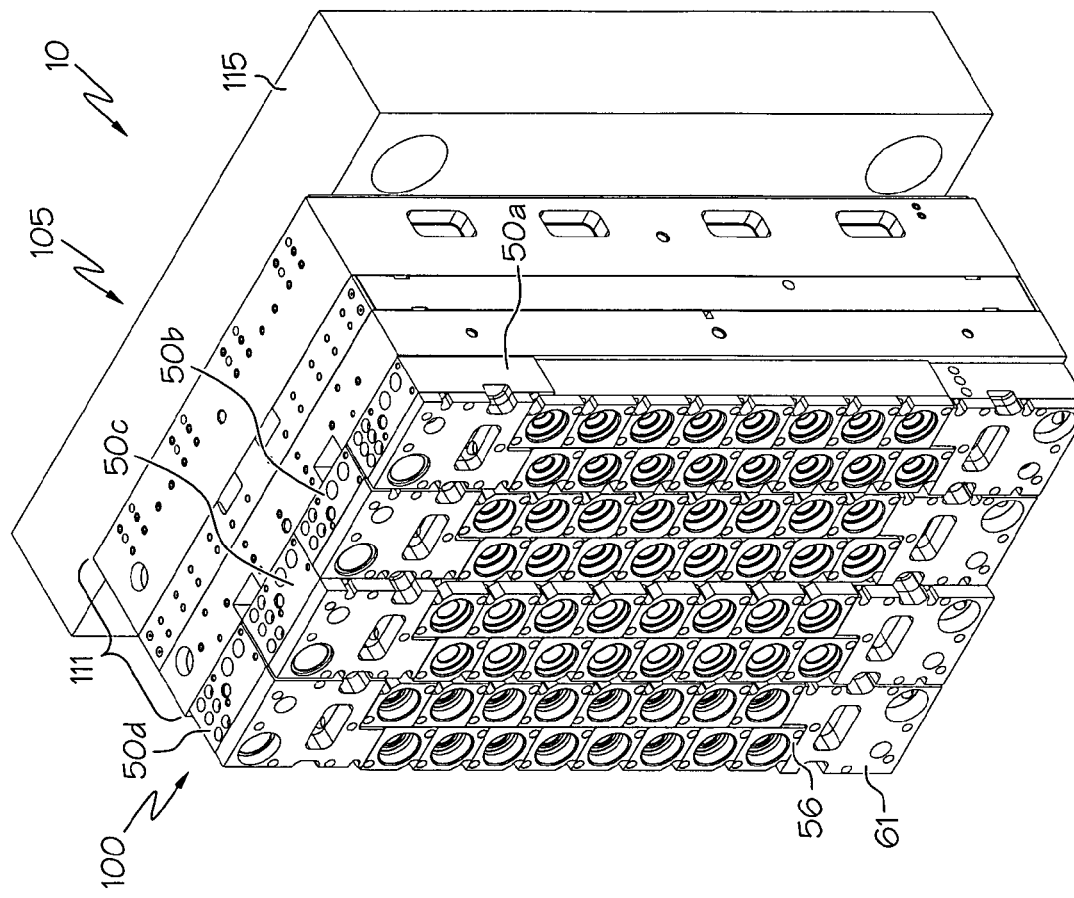
FIG. 2a is a perspective view of an exemplary embodiment of a cavity side of a preform mold system of according to the present invention connected to a cavity side stationary platen of an injection mold machine.
Figure 2B:
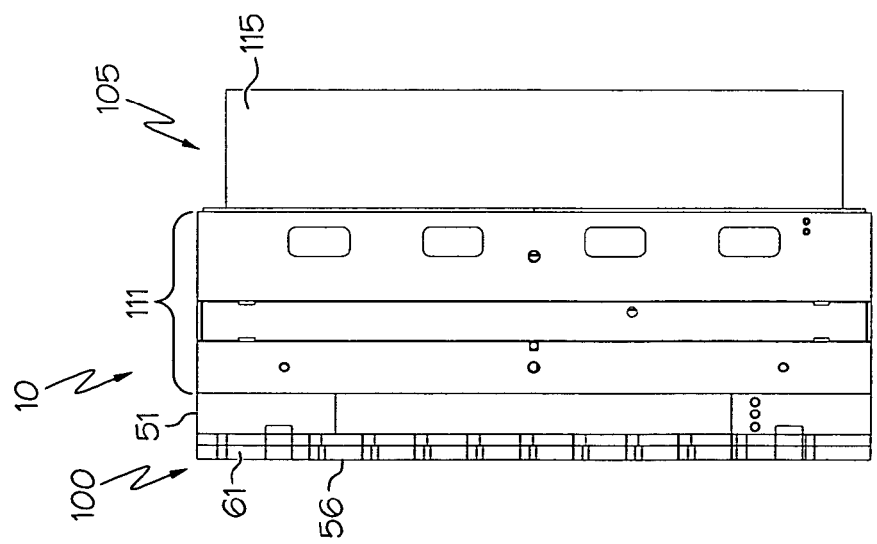
Figure 2C:
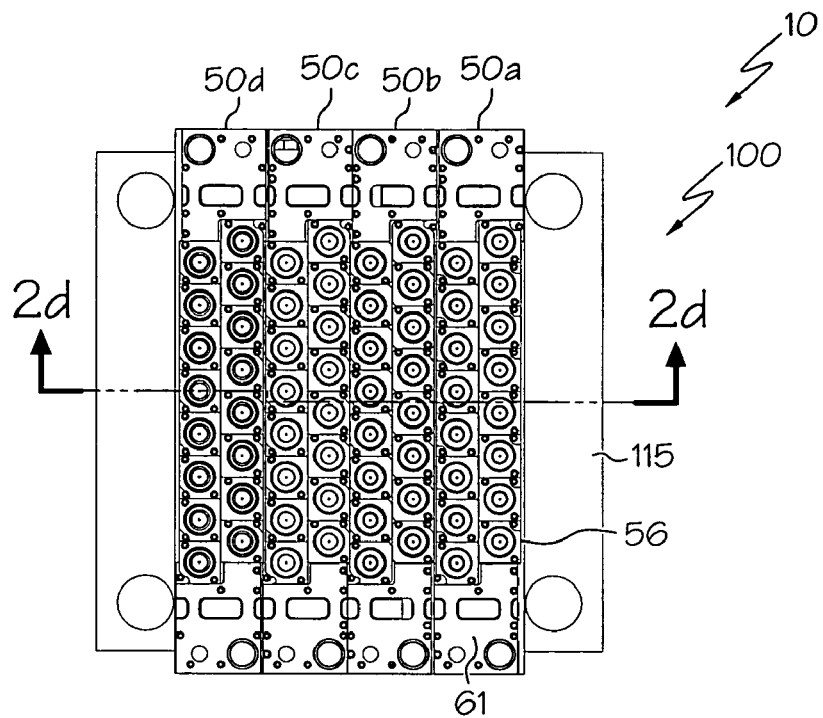
Figure 2D:
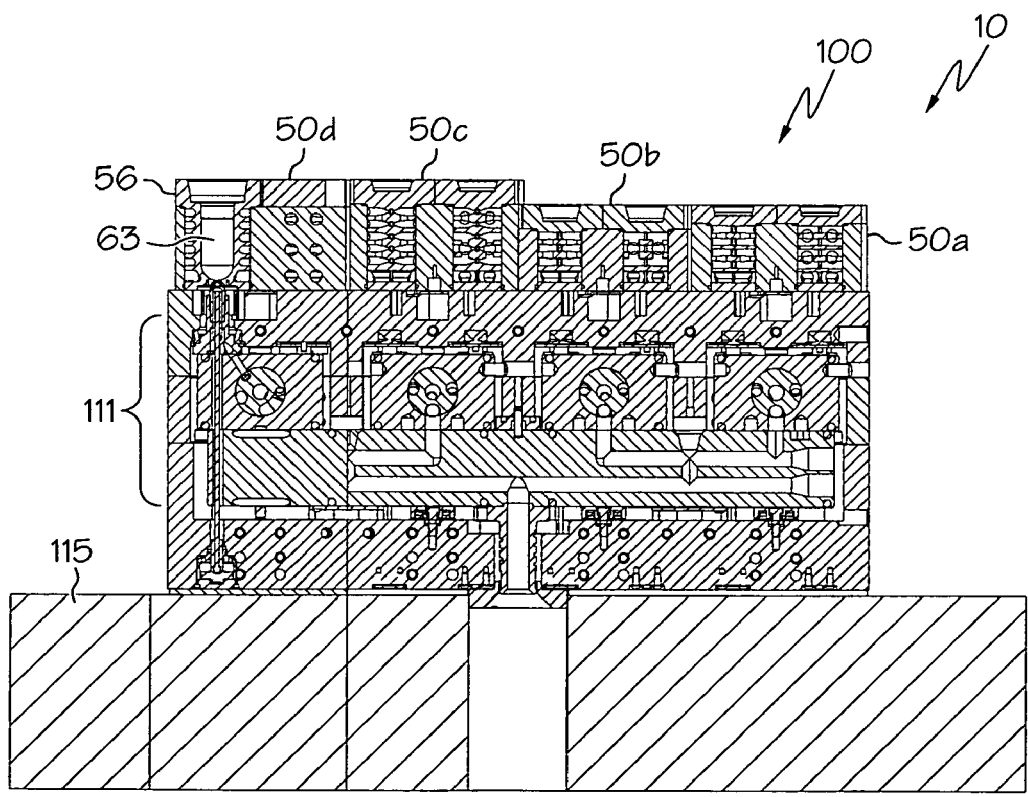
FIG. 2d is a cross sectional view of the cavity side of the preform mold system connected to the stationary platen taken along A-A of FIG. 2c.

As set forth above, preform mold system 10 of the present invention is operable to connect to an injection mold machine, including but not limited to connecting to and/or retrofitting a conventional injection mold machine. Generally, a preform injection mold machine comprises a core side 45 and a cavity side ("hot side") 105 as known to one of ordinary skill in the art. For illustrations purposes only, and not limitation, FIG. 1 shows an exemplary embodiment of core side 40 of preform mold system 10 connected to core side 45 of an injection mold machine. Specifically, clamp plate 34 is operable to receive and connect to one or more of core side modules 20 (e.g., 20a, 20b, 20c, 20d) and connects the core side modules to a moving platen 44 of core side 45 of an injection mold machine. Specifically, core side modules 20 are connected to clamp plate 34 using bolts that are connected into bolt holes disposed within clamp plate 34. The bolts and bolt holes are positioned such that they are accessible in the press of the injection mold machine. Such easy bolt on and off connectivity of core side modules 20 from clamp plate 34 of preform mold system 10 provide quick mold change out and adaptability capabilities to an injection mold machine, thus reducing long production down times due to lengthy mold change outs. Clamp plate 34 of the present invention is connected to moving platen 44 of the injection mold machine using toe clamps as known to one of ordinary skill in the art.

As shown in FIG. 1, three core side modules 20a, 20c, 20d are shown attached to the core side clamp plate 34, leaving an open position B on clamp plate 34 available to receive second core side module 20b if desired, although not required to run the system to mold preforms. Although the exemplary embodiment only shows clamp plate 34 configured to receive and/or connect to four core side modules 20a, 20b, 20c, 20d, it is understood that the core side clamp plate may be configured to receive a plurality of core side modules, depending upon the preform design, number of preform cores 6 per module, etc. For example, clamp plate 34 shown in FIG. 1 may be replaced with a different clamp plate (not shown) configured to receive and/or connect to up to six core side modules.

Also for illustration purposes only, and not limitation, FIG. 2 shows an exemplary embodiment of cavity side 100 of preform mold system 10 connected to a cavity side 105 of an injection mold machine. Specifically, manifold and valve gate assembly 111 is operable to receive one or more of cavity side modules 50 (e.g., 50a, 50b, 50c, 50d) and connect the modules 50 to a stationary platen 115 of cavity side 105 of the injection mold machine. Manifold and valve gate assembly 111 also places the cavity side modules 50a, 50b, 50c, 50d in fluid communication with an injector (not shown) of the injection mold machine. In addition, manifold and valve gate assembly 111 is operable to distribute and control from the injector a uniform flow of fluidized plastic to each preform mold 67 of each attached preform mold stack-up module. Manifold and valve gate assembly 111 is balanced as known to one of ordinary skill in the art to deliver the same pressure to each preform mold 67 of the preform mold system 10. Although the exemplary embodiment only shows four cavity side modules 50a, 50b, 50c, 50d connected to and in fluid communication with manifold and valve gate assembly 111, it is understood that the manifold and valve gate assembly 111 may be configured and operable to receive any number of cavity side modules 50, depending upon the preform design, number of preform cavities 56 per module, and size of the injection mold machine. For example, manifold and valve gate assembly 111 shown in FIG. 2 may receive up to six cavity side modules 50.

Manifold and valve gate assembly 111 are designed to modify and control the fluidized plastic's flow from the injection mold machine to each preform mold 67. When combined with the machine parameters for injection pressure, melt temperature, and other injection and operational parameters the preform mold system 10 of the present invention enables a single injection mold machine to inject fluidized plastic into each distinctly sized, shaped, and/or finished preform mold 67 (e.g., core/cavity combination) in a uniform flow. As such, preform mold system 10 is capable of molding (or forming) multiple preform designs simultaneously with a single injection mold machine.

As known to one of ordinary skill in the art and schematically shown in FIG. 1, core side 45 of the injection mold machine also may comprise a clamp unit 46 connected to both an ejector platen 42 and moving platen 44. The injection mold machine may include an ejector activation system (not shown) that are connected to ejector platen 42, and may or may not be connected to ejector housing assemblies 70 of the present invention. It is understood that a variety of commercially available injection mold machines as known to one of ordinary skill in the art may be used with preform mold system 10 of the present invention, including but not limited to molding machines and components shown and describe in one or more of the following U.S. patents: U.S. Pat. Nos. 4,202,522; 4,219,323; 4,268,240; 4,330,257; 4,395,222; 4,412,806; 5,533,883; 5,536,164; 5,620,723; 5,738,149; 5,863,485; 6,082,991; 6,123,891; 6,135,757; 6,143,215; 6,220,850; 6,726,465; 6,749,779; and/or 7,037,103, which are all herein incorporated by reference. Two exemplary molding machines that the universal mold system 10 of the present invention may be operable to connect to and function with includes, but are not limited to, a HUSKY 300 ton injection mold machine or a HUSKY 600 ton injection mold machine commercially available from HUSKY Injection Molding Systems Ltd.

Figure 3:
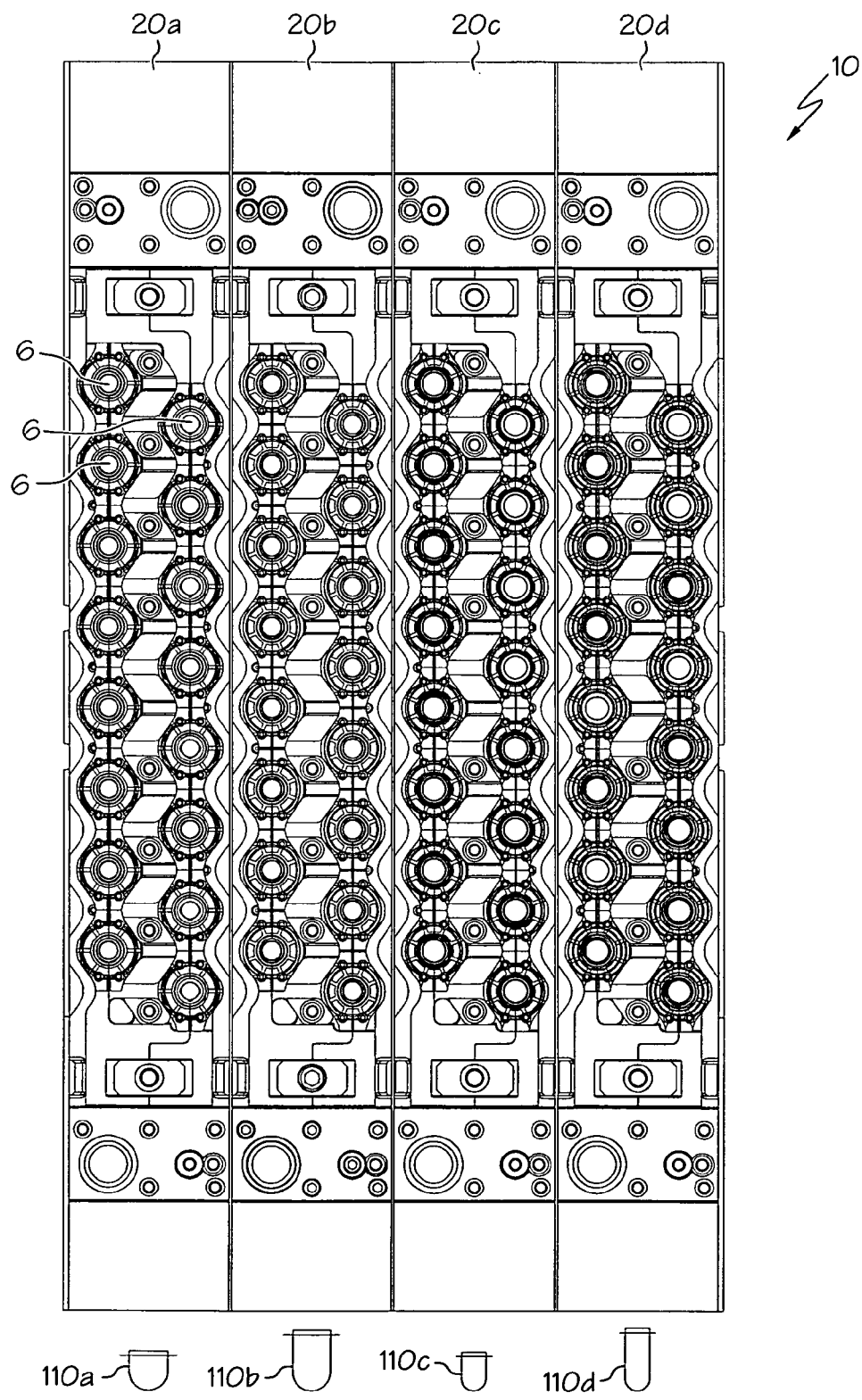
FIG. 3 is a front view of an exemplary embodiment of four core side preform mold modules according to the present invention, wherein each of the core side preform modules are configured for a different preform design.

Each of the core side modules 20 may comprise a plurality of cores 6, extending outwardly from the core side module (e.g., FIGS. 3 and 4). Referring to FIGS. 1, 3, 4, 9, and 11-14, an individual core side module 20 is shown and described in detail below. When the core side module 20 is assembled, the core plate 1 serves as a base, a base end 6b of the sixteen cores 6 are inserted into the apertures 35 of the core plate 1 such that a flange 6a of the cores 6 rests upon a top surface 6c of the core plate 1. The sixteen core sleeves 11 are then slid onto the sixteen cores 6 such that flange 37 of the core sleeves 11 rests upon the core plate 1 and the flange 6a of the cores 6. The ejector plate 22 is then position upon the flange 37 such that the cores 6 and respective core sleeves 11 are inserted into each of the apertures 48 of the sleeves 11. The wear plate 25 is then positioned upon the ejector plate 22 such that the cores 6 are inserted through and the sleeves 11 extend through.

Next, the left and right carrier plates 29 and 30 are positioned upon the wear plate 25 such that the cores 6 extend through apertures 39. The thread splits 32 are slid over the cores 6 such that the cores 6 insert through apertures 47 and then connected to the left and right ejector plates such that the thread splits 32 are positioned relative to the cores 6 to create the thread finish. Two gibs 27, shown in FIGS. 1, 4, and 14, are connected to opposite ends of the ejector plate 22 and engage opposite ends of the left and right plate carriers 29 and 30, respectively, and assist in holding the core side module 20 together. As assembled, the apertures 35, 38, 48, 39, 47, 49 are coaxially aligned coaxially with each other. The core side modules 20 also comprise two Y-Cams 14 that are connected to opposite ends of the core plate 1 and that extend through the ejector plate 22 and the left and right carrier plates and two return cams 16 positioned opposite each other along each Y-Cam as shown. These Y cams create the opening of the threadsplits that is required to eject or remove the finish molded preform.

Also, each cavity side module 50 may comprise a plurality of cavities 56 disposed therein corresponding to each core 6 of the respective core side module (e.g., FIG. 5). Referring now to FIGS. 2, 5, 8, 10, and 21, an exemplary embodiment of the cavity side module 50 is shown. The cavity side module 50 comprises a cavity plate 51 that comprises a plurality of apertures 62 (e.g., sixteen staggered apertures disposed in two rows of eight) disposed therein and along the plate 51 such that the apertures align with the respective cores 6 of the core side module 20 when the two modules are placed into mating engagement with each other as set forth above. A plurality of cavity portions 56 are inserted into each of the apertures 62 and attached to the plate 51. The cavity side module 50 comprises thirty two baffle cavities 57 (which equals two baffle cavities per cavity portion 56), ninety-six baffle cavities 58 (which equals six baffle cavities per cavity portion 56), and thirty-two baffle cavities 59 (which equals two baffle cavities per cavity portion 56).

Figure 6A:
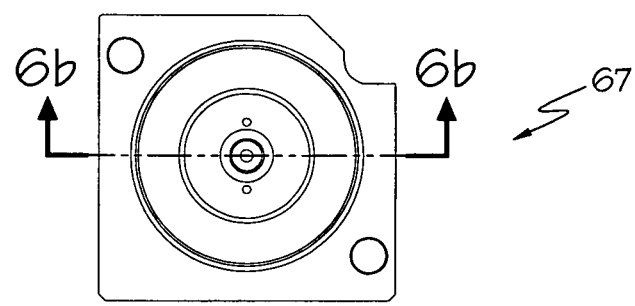
FIG. 6a is a top plan view of an exemplary embodiment of a single preform mold stack-up according to the present invention, wherein a core is inserted into a cavity to form a preform mold.

Each cavity portion 56 comprises a shaped chamber 63 that is configured to receive the respective cores 6 such that the combination of the shape chamber 63 and the inserted core 6 forms the mold chamber 65, creating a specific preform design. At each end of the cavity plate 51 and disposed upon its top surface are two filler blocks 61 as shown in FIGS. 2, 5, and 8. The cavity side module also includes two self lube bushings 53 within an opening through the cavity plate 51, forty-four connectors 60, sixteen o-rings 52 positioned around a base of each cavity 56, eighteen brass pipe plugs, and sixteen o-rings 55 positioned around an upper portion of each cavity 56 as shown in FIG. 6.

As set forth above, each of the core side modules 20 (e.g., first core side module 20a, second core side module 20b, third core side module 20c, and fourth core side module 20d) and respective cavity side modules 50 (e.g., first cavity side module 50a, second cavity side module 50b, third cavity side module 50c, and fourth cavity side module 50d are configured to matingly engage one another, forming respective preform mold stack-up modules (first mold stack-up module, second mold stack-up module, third mold stack-up module, and fourth mold stack-up module). Each preform mold stack-up module may comprise a plurality of preform molds 67 disposed therein formed by the plurality of core 6/cavity 56 combinations (e.g., preform mold 67 shown in FIG. 6).

Figure 6B:
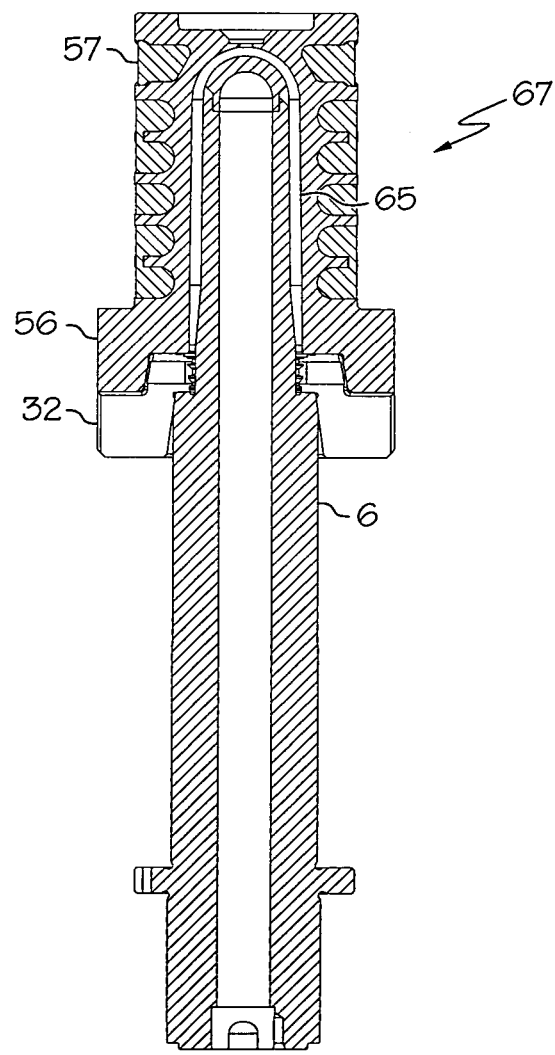

As an example, when preform mold system 10 is connected to an injection mold machine, a clamping system (e.g., moving platen 44) of the injection mold machine can move core side modules (e.g., 20a, 20b, 20c, 20d) into mating engagement with cavity side modules (e.g., 50a, 50b, 50c, 50d), wherein the plurality of cores 6 of the core side modules are inserted into the plurality of respective cavities 56 of the cavity side modules to form the preform molds 67 within the four preform mold stack-up modules. FIG. 6b shows a cross section of a representative single mold stack-up, wherein a single core 6 is inserted into a single cavity 56 having a preform mold chamber 65 therebetween, forming the preform mold 67.

A fluidized plastic may be injected by the injector of the mold machine through the manifold and valve gate assembly 111 into the preform mold chambers 65 of each preform mold 67 of each preform mold stack-up module to form a plurality of plastic preforms having one or more preform designs or the same preform design. Due to the separate preform mold modules of preform mold system 10 being separately connectable and disconnectable to a single injection mold system, the present invention transforms and enables a single convention injection mold machine to form (mold) multiple preform designs simultaneously and to be adjustable as to its production output. For example, and not limitation, first core side module 20a and respective first cavity side module 50a may be designed to form a preform having a first preform design 110A, second core side module 20b and respective second cavity side module 50b may be designed to form a preform having a second preform design 110B, third core side module 20c and respective third cavity side module 50c may be designed to form a preform having a third preform design 110C, and fourth core side module 20d and respective fourth cavity side module 50d may be designed to form a preform having a fourth preform design 110D. Although not shown in FIGS. 1 and 2, the exemplary embodiment of the preform mold system 10 may permit a fifth and a sixth preform mold module to be connected to it. As such, the individual mold stack-up modules can be configured such that first preform design 110A, second preform design 110B, third preform design 110C, fourth preform design 110D, fifth preform design (not shown), and sixth preform design (not shown) are all different from each other as shown in FIG. 3, all the same, or some combination thereof. As will be explained below herein, preform mold system 10 of the present invention is configured such that it enables a single injection mold machine to mold one or more preform designs simultaneously, or sequentially. Each preform design may be assessed through mold flow analysis as known to one of ordinary skill in the art to determine the fill characteristics required (injection pressure and fill time) to mold the different preforms having the specific designs.

The quantity of preform molds 67 per preform mold stack-up module is based upon preform size and weight, and balanced material flow. The exemplary embodiment of preform mold system 10 comprises sixteen preform molds 67 per preform mold stack-up module (e.g., sixteen cores 6 per first core side module 20a/and sixteen cavities 56 per first cavity side module 50a). In the exemplary embodiment, the sixteen cores 6 are disposed in two rows of eight staggered cores 6 per core side module. The exemplary embodiment also may include sixteen cavities 56 disposed in respective two rows of eight staggered cavities 56 per cavity side module.

As shown, the clamp plate (e.g., 34) and manifold and valve gate assembly 111 are operable to receive four of these core side modules and four of these cavity side modules, respectively. Also, manifold and valve gate assembly 111 is operable to uniformly control and distribute the fluidized plastic into each of the preform molds 67 of one or more the preform mold stack-up modules that are attached to the injection mold machine. As such, the exemplary embodiment of preform mold system 10 may comprise from one to four mold stack-up modules comprising from sixteen preform molds (67) to sixty-four preform molds (67) that may be connected to an injection mold machine. Such a configuration of preform mold system 10 enables one injection mold machine to form from sixteen preforms to sixty-four preforms and from one to four different preform designs, simultaneously or sequentially, which conventional injection mold machines are not capable of doing.

As another example, clamp plate 34 may be configured to receive and connect to up to six core side modules 20 of preform mold system 10. In addition, preform mold system may comprise six respective cavity side modules 50 corresponding to the core side modules. As shown in FIGS. 4 and 5, both core side modules 20 and cavity side modules 50 may comprise sixteen staggered cores 6 and sixteen staggered cavities 56, respectively. Thus, each of the six core side modules 20 are operable to matingly engage with one of the six cavity side modules 50 to form sixteen preform molds 67 per preform mold stack-up module. Also, manifold and valve gate assembly 111 is operable to uniformly control and distribute the fluidized plastic into each of the preform molds 67 of one or more the preform mold stack-up modules that are attached to the injection mold machine. As such, the exemplary embodiment of preform mold system 10 may comprise from one to six mold stack-up modules comprising from sixteen preform molds (67) to ninety-six preform molds (67) that may be connected to an injection mold machine. In such a configuration, preform mold system 10 enables one injection mold machine to form from sixteen preforms to ninety-six preforms and from one to four different preform designs, simultaneously or sequentially, which conventional injection mold machines are not capable of doing.

It is understood that the quantity of molds per stack-up module and the configuration may vary, depending upon the preform design. Other exemplary embodiments of preform mold system 10 may comprise a total number of preform molds 67 (i.e., cavitation) of 4, 8, 16, 32, 48, 64, 80, 96, 100 molds, or more. In addition, the molds 67 may be positioned in other configurations such as inline rather than staggered.

Also, the number of preform mold modules that may be included with preform mold system 10 may be based on injection mold machine size (shot size, clamp size and clamp tonnage). As an alternative exemplary embodiment, the preform system 10 may comprise core side modules that comprise twenty cores 6, staggered in two rows of ten cores, and respective cavity side modules that comprise twenty respective cavities 56, staggered in two rows of ten cavities. In such an embodiment, clamp plate 34 and manifold and valve gate assembly 111 are operable to receive five of these core side modules and five of these cavity side modules, respectively. Also, manifold and valve gate assembly 111 is operable to uniformly control and distribute the fluidized plastic into each of the preform molds 67 of one or more the preform mold stack-up modules that are attached to the injection mold machine. Thus, in this exemplary embodiment, preform mold system 10 enables a single injection mold machine to form from twenty to one hundred preforms and from one to five different preform designs, simultaneously or sequentially.

Figure 7B:
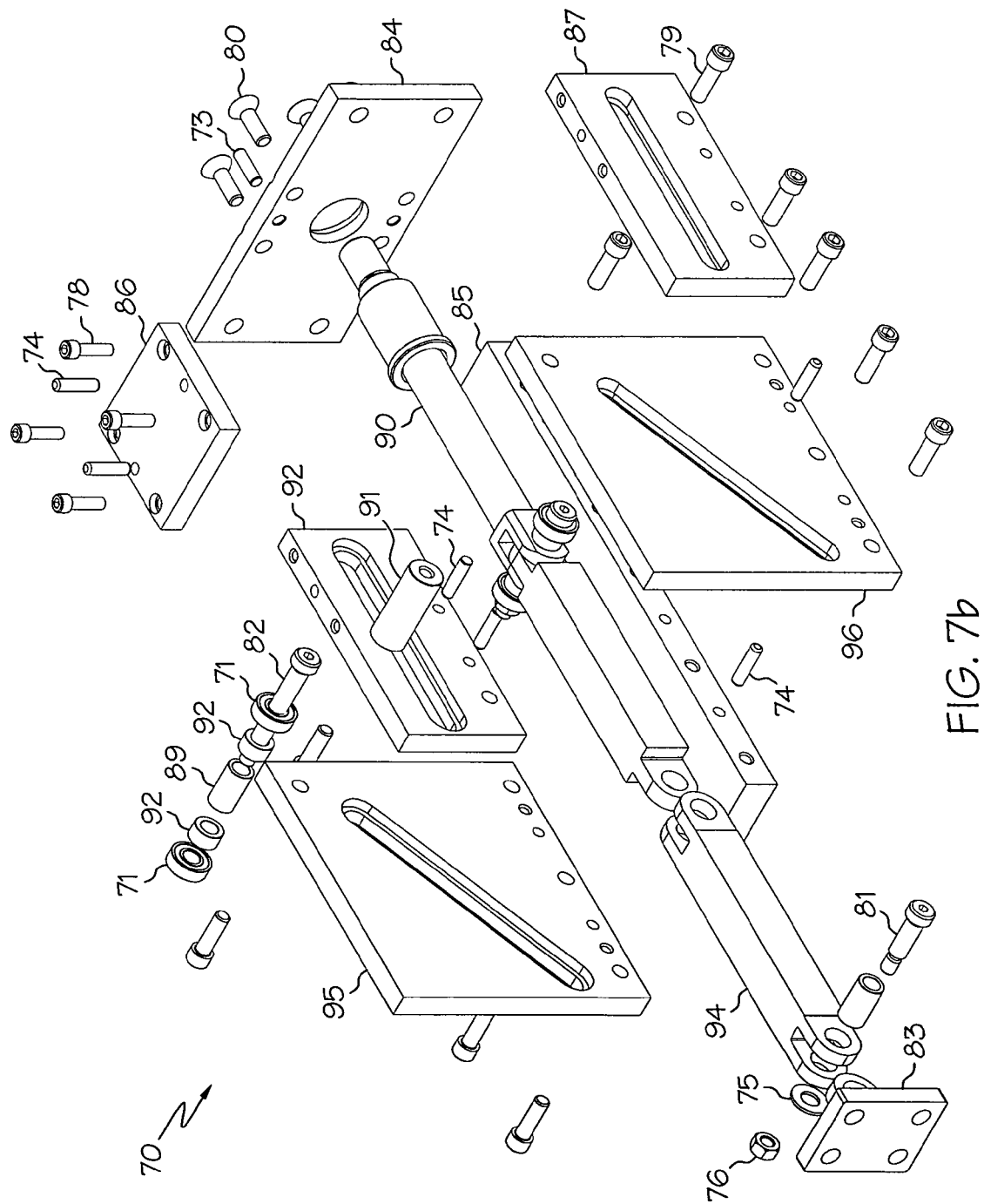
Figure 8A:
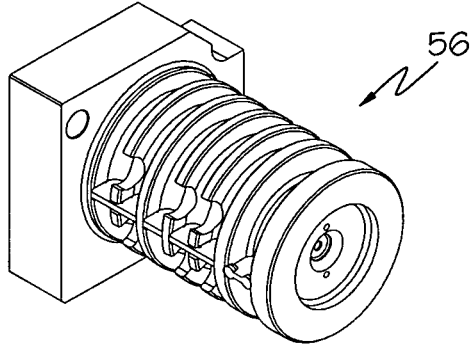
FIG. 8a is a perspective view of an exemplary embodiment of a cavity portion of the cavity side module according to the present invention.
Figure 8B:
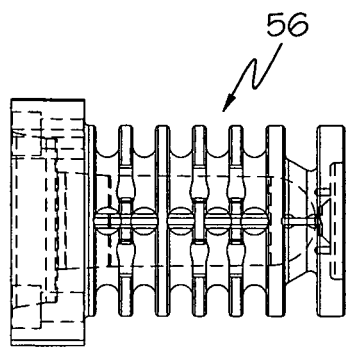
Figure 8C:
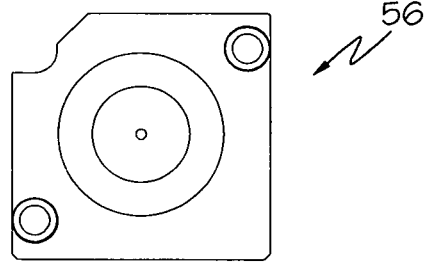
Figure 8D:
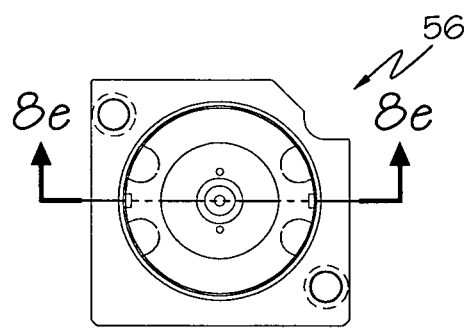
Figure 8E:
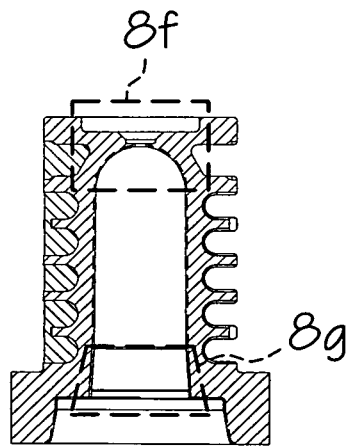
FIG. 8e is a cross sectional view of the cavity portion taken along A-A of FIG. 8d.
Figure 8F:
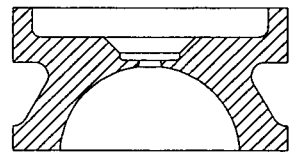
FIG. 8f is a detail view of the cavity portion taken at B of FIG. 8e.
Figure 8G:
FIG. 8g is a detail view of the cavity portion taken at C of FIG. 8e.
Figure 9A:
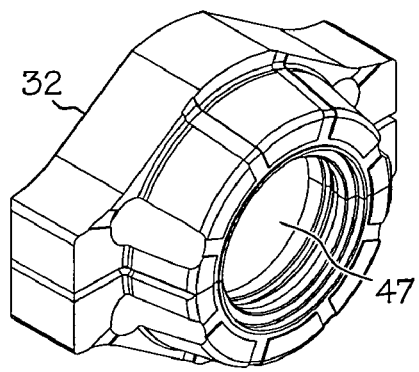
FIG. 9a is a perspective view of an exemplary embodiment of a thread split according to the present invention.
Figure 9B:
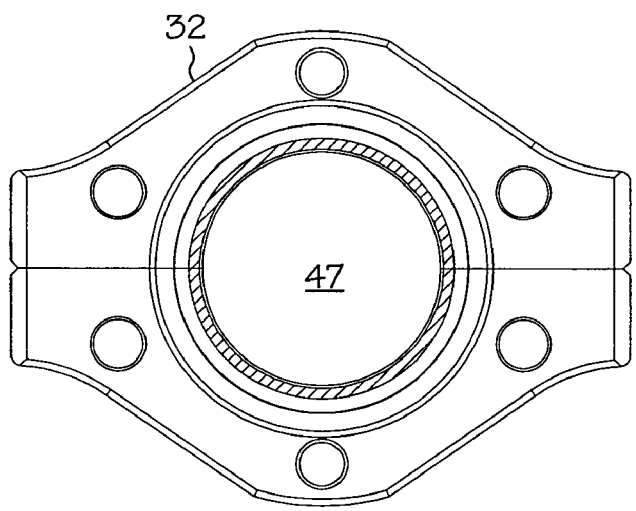
Figure 9C:
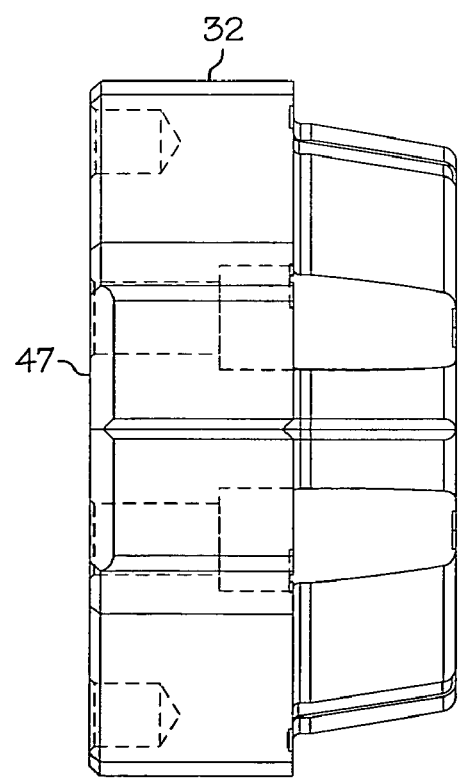
Figure 9D:
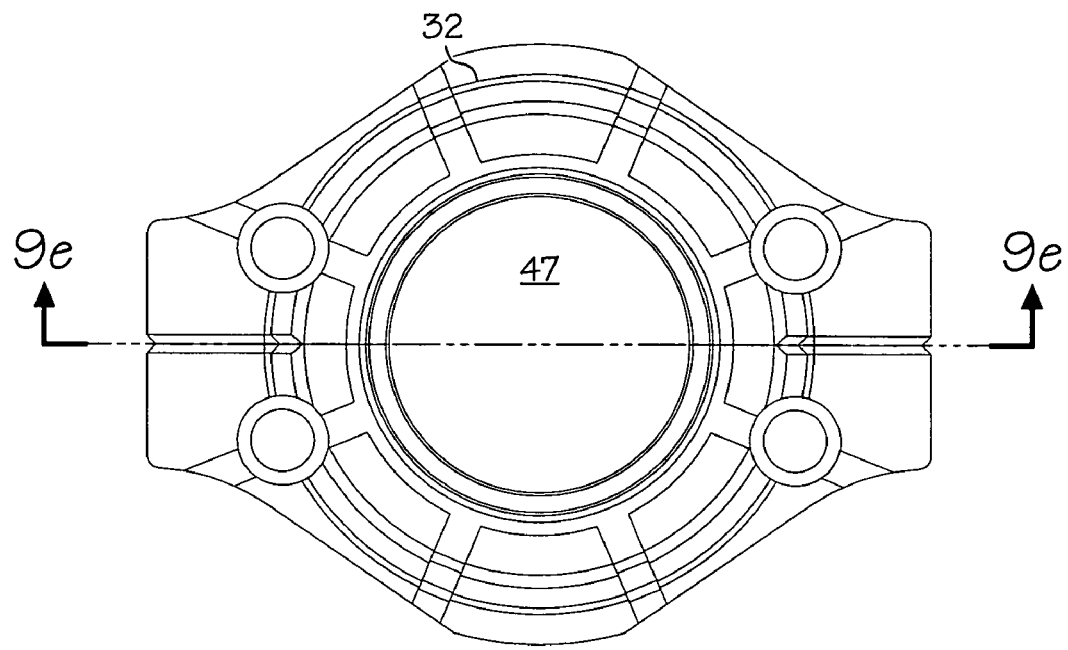
Figure 9E:
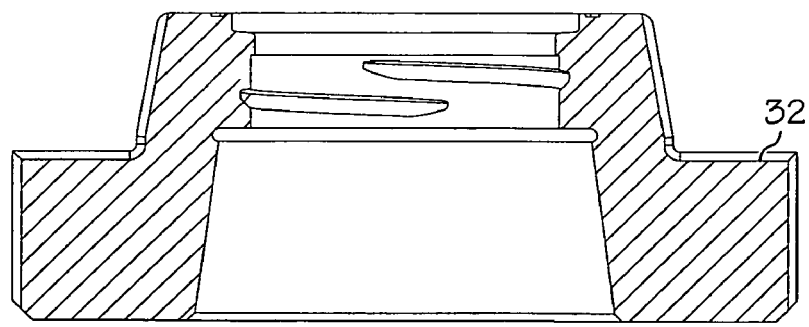
FIG. 9e is a cross sectional view of the thread split taken along A-A of FIG. 9d.
Figure 10A:
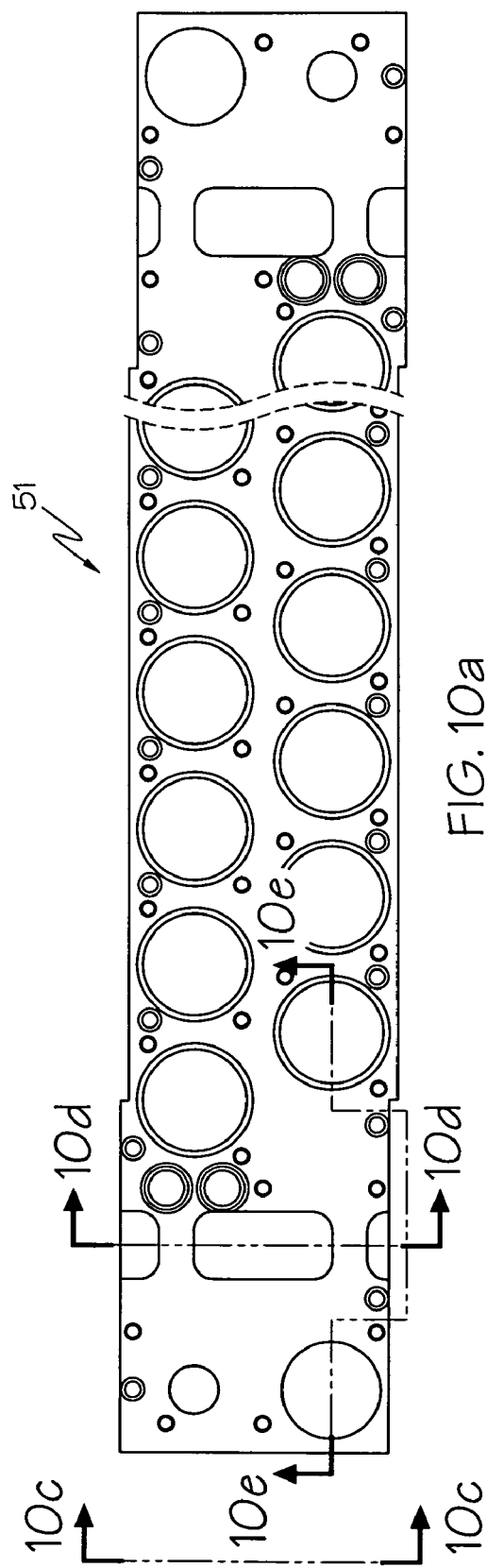
Figure 10B:
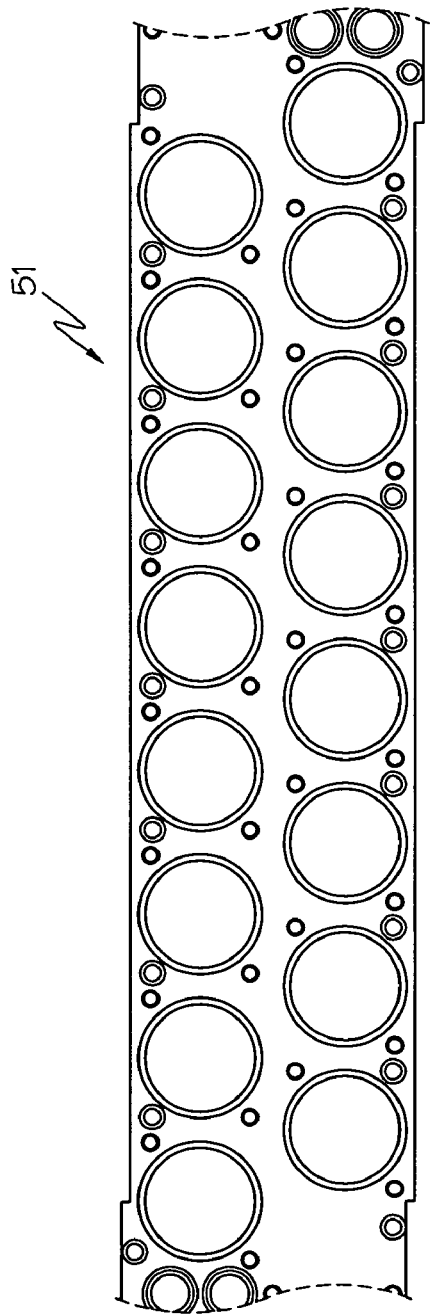
Figure 10D:
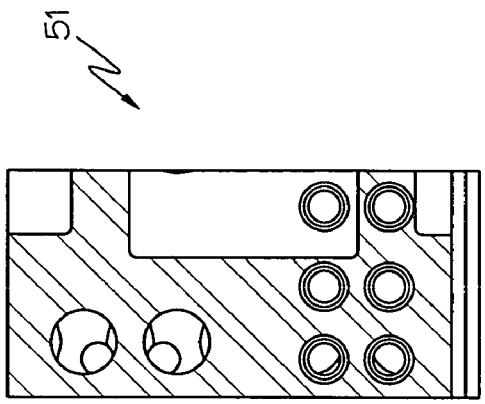
Figure 10E:
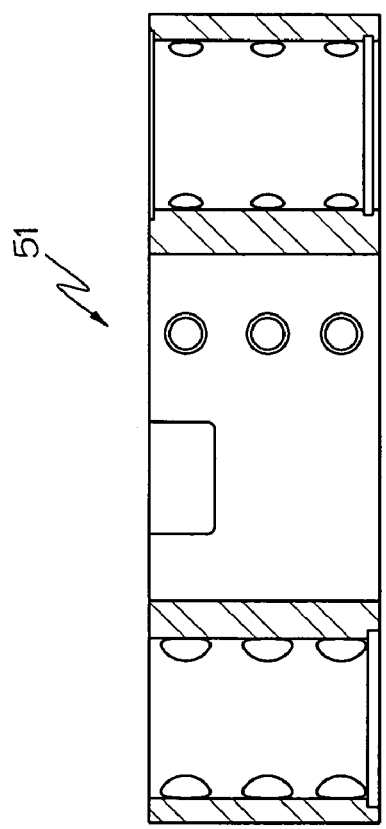
Figure 10C:
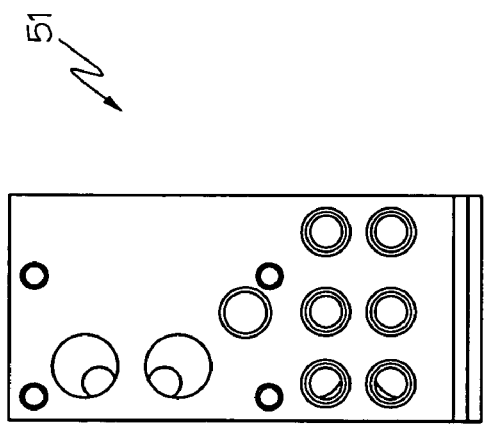
Figure 11A:
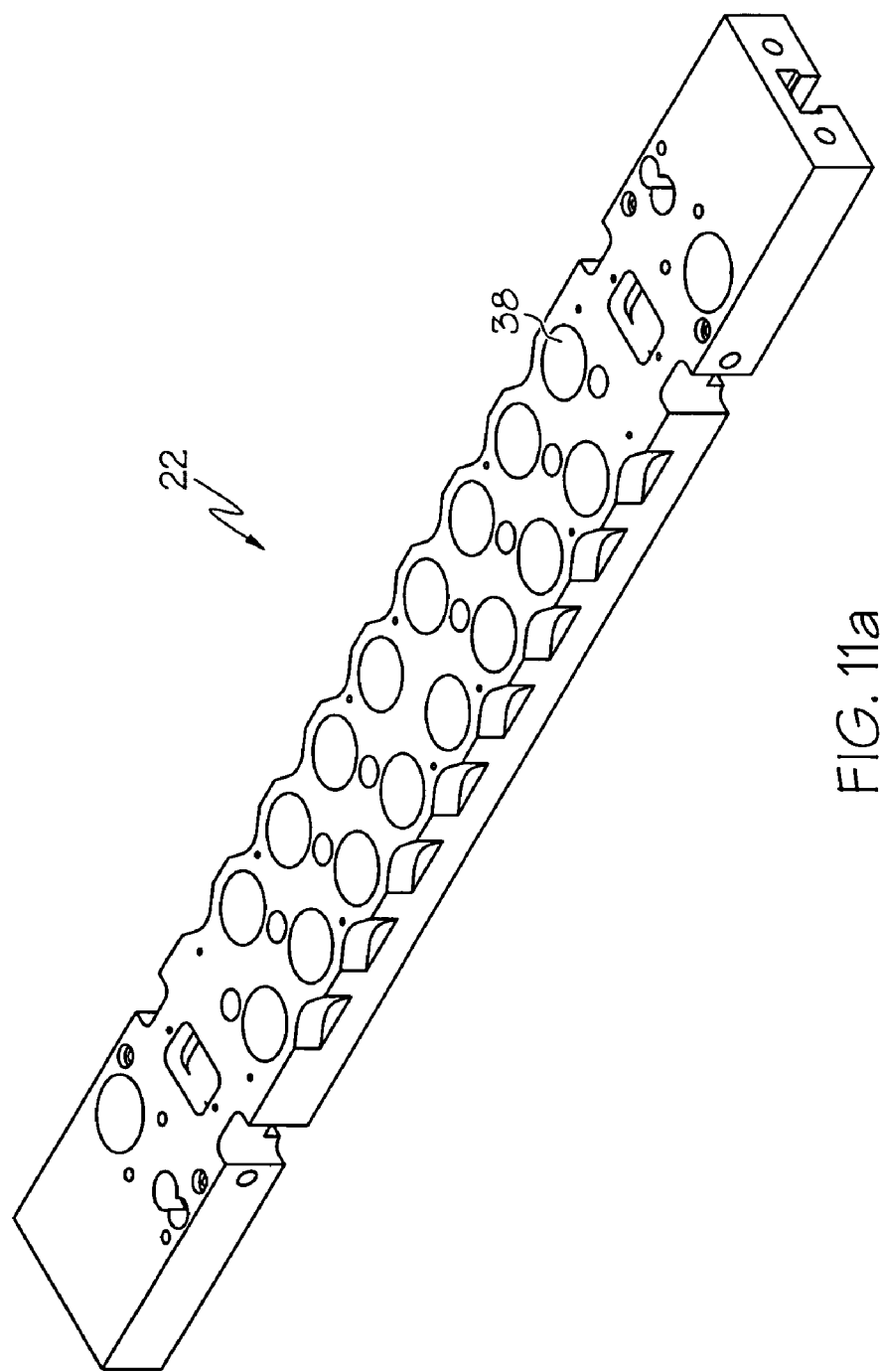
Figure 11F:
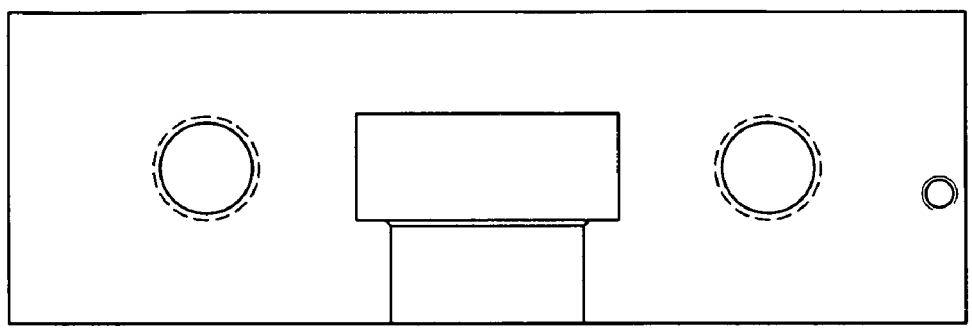
FIG. 11f is a cross sectional view of the ejector plate taken along C-C of FIG. 11b.
Figure 11E:
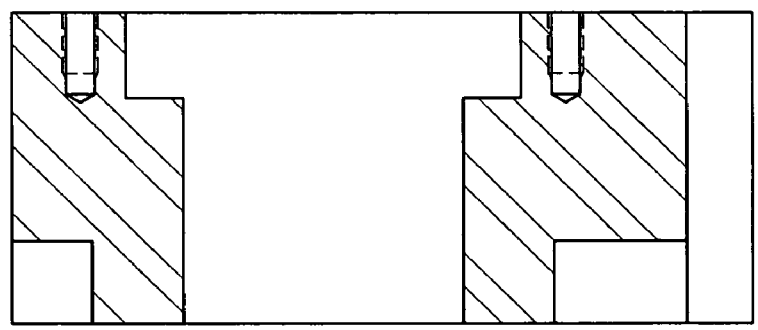
FIG. 11e is a cross sectional view of the ejector plate taken along B-B of FIG. 11b.
Figure 11D:
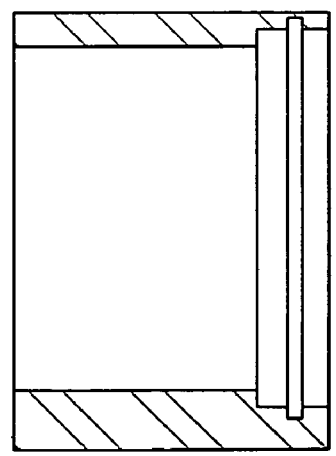
FIG. 11d is a cross sectional view of the ejector plate taken along A-A of FIG. 11b.
Figure 12A:
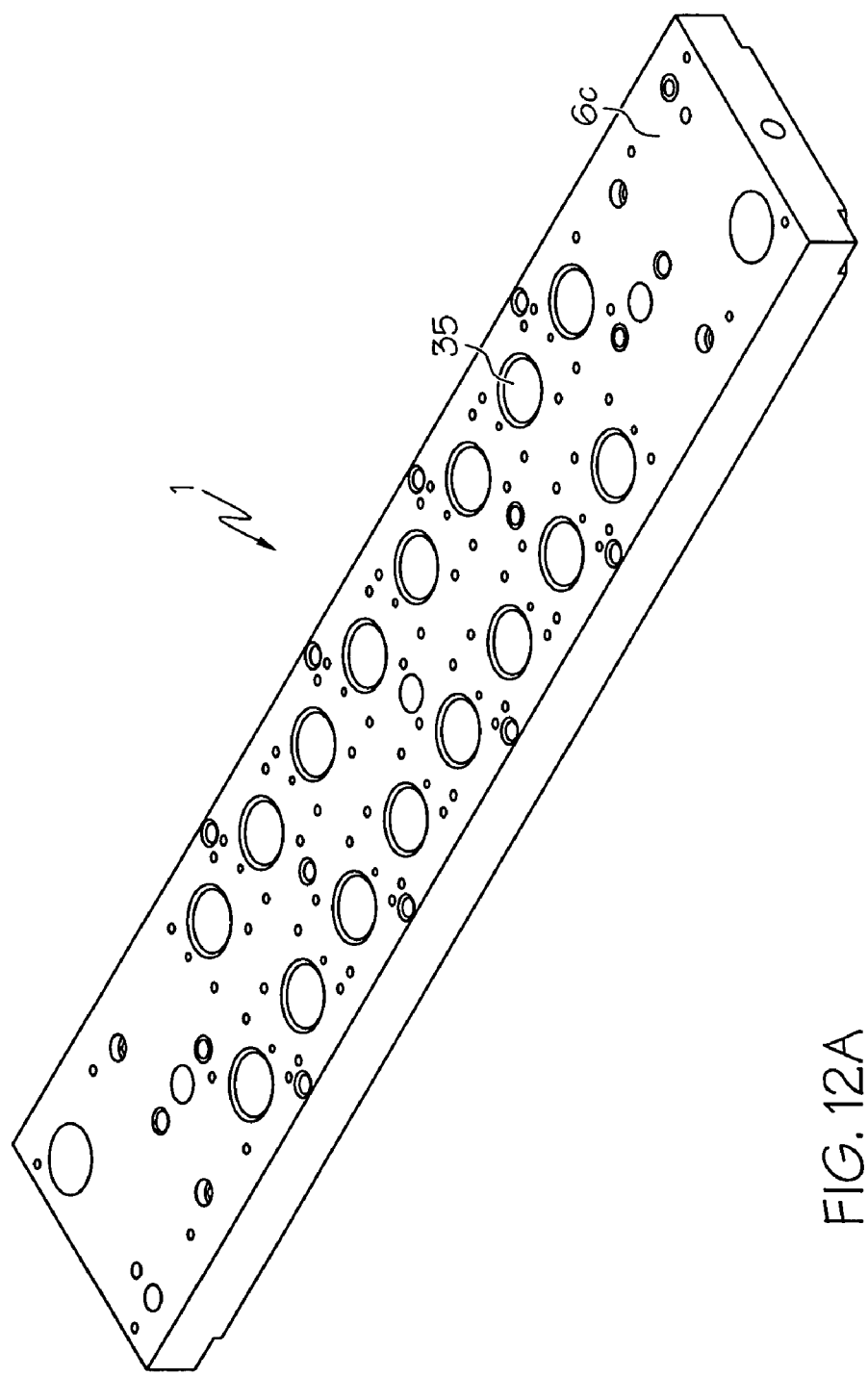
Figure 12B:
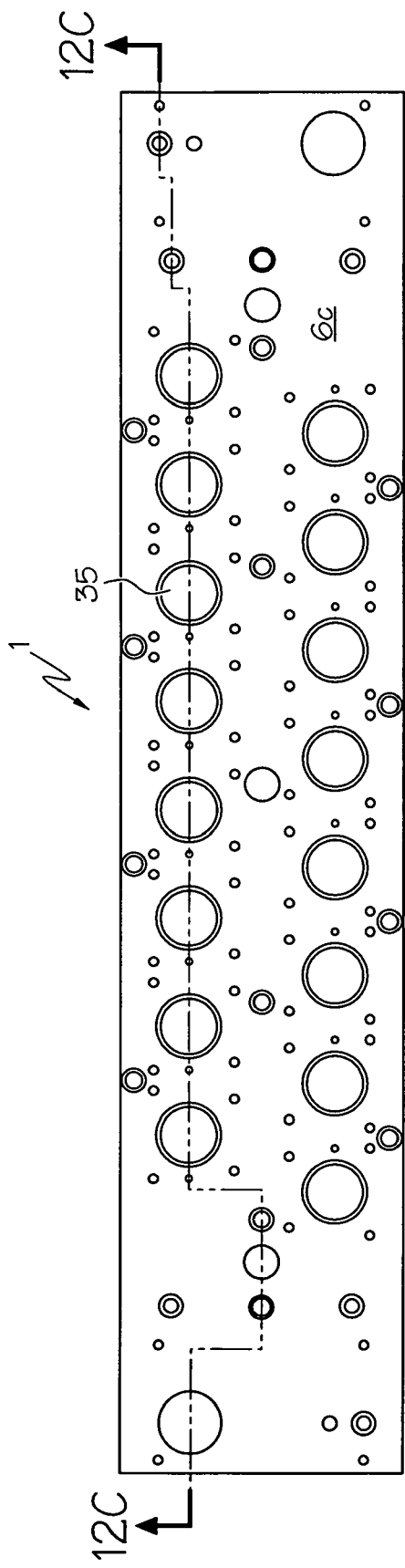
Figure 12C:
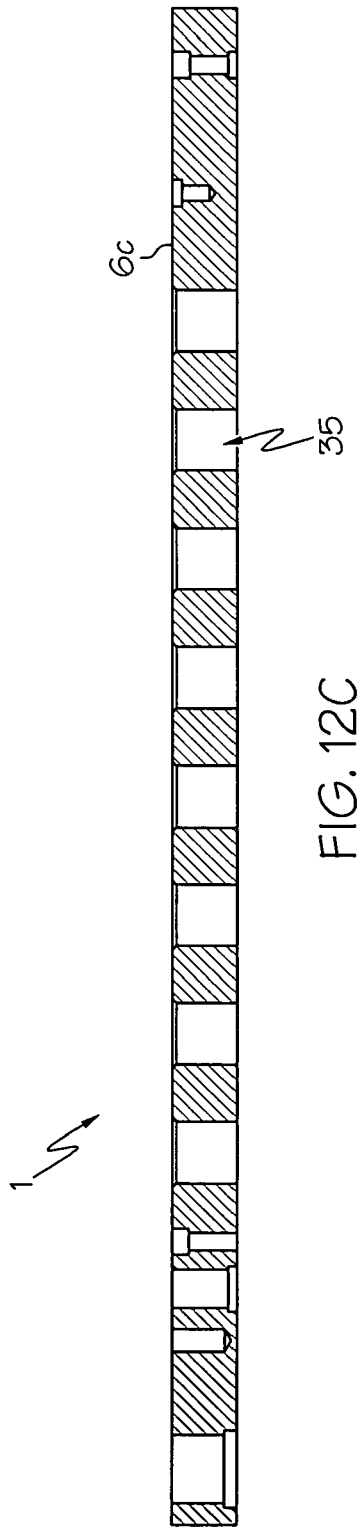
Figure 13C:
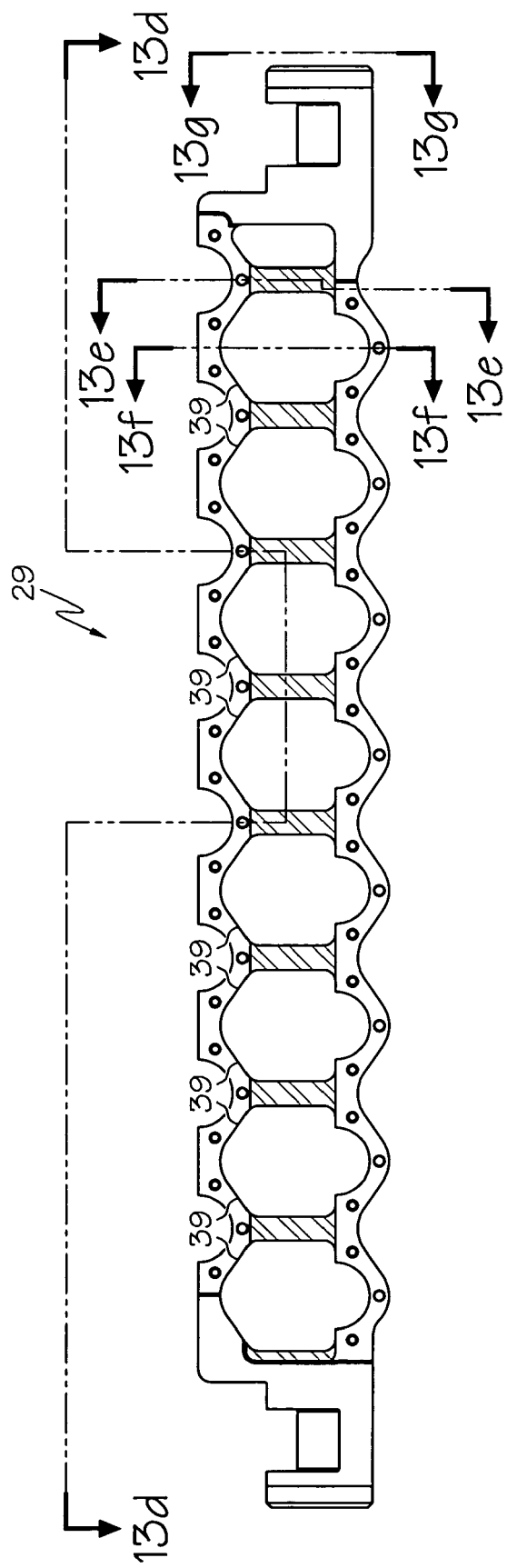
Figure 13D:
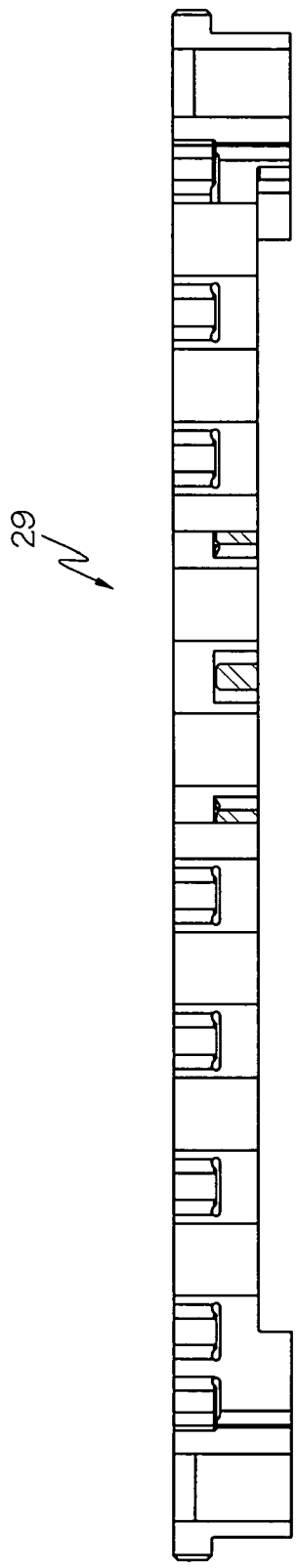
FIG. 13d is view of the left carrier plate taken along A-A of FIG. 13c.
Figure 13G:
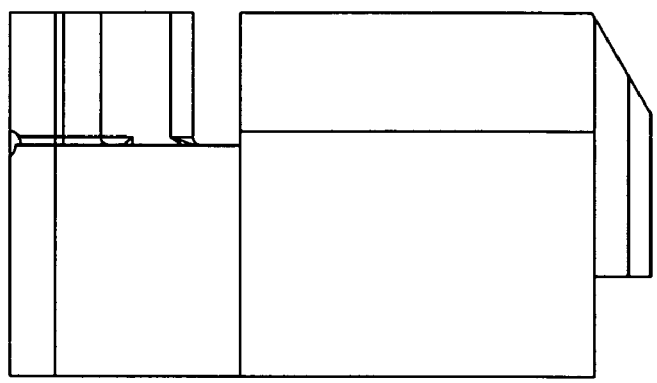
FIG. 13g is a view of the left carrier plate taken along D-D of FIG. 13c.
Figure 13F:
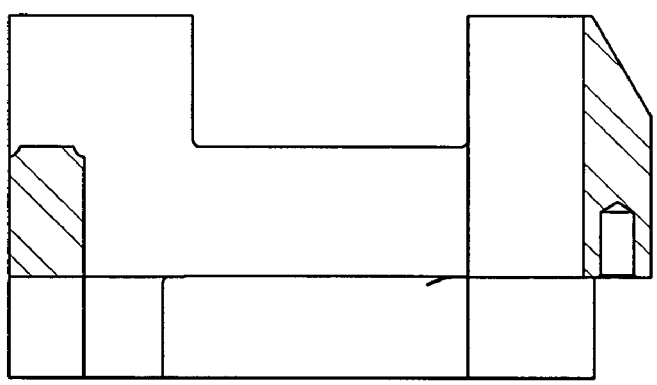
FIG. 13f is a cross sectional view of the left carrier plate taken along C-C of FIG. 13c.
Figure 13E:
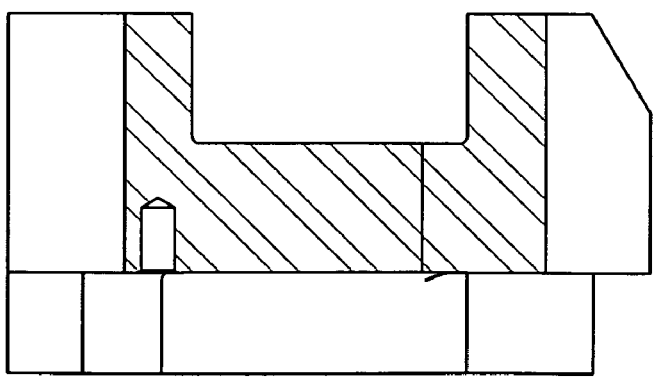
FIG. 13e is a cross sectional view of the left carrier plate taken along B-B of FIG. 13c.
Figure 14C:
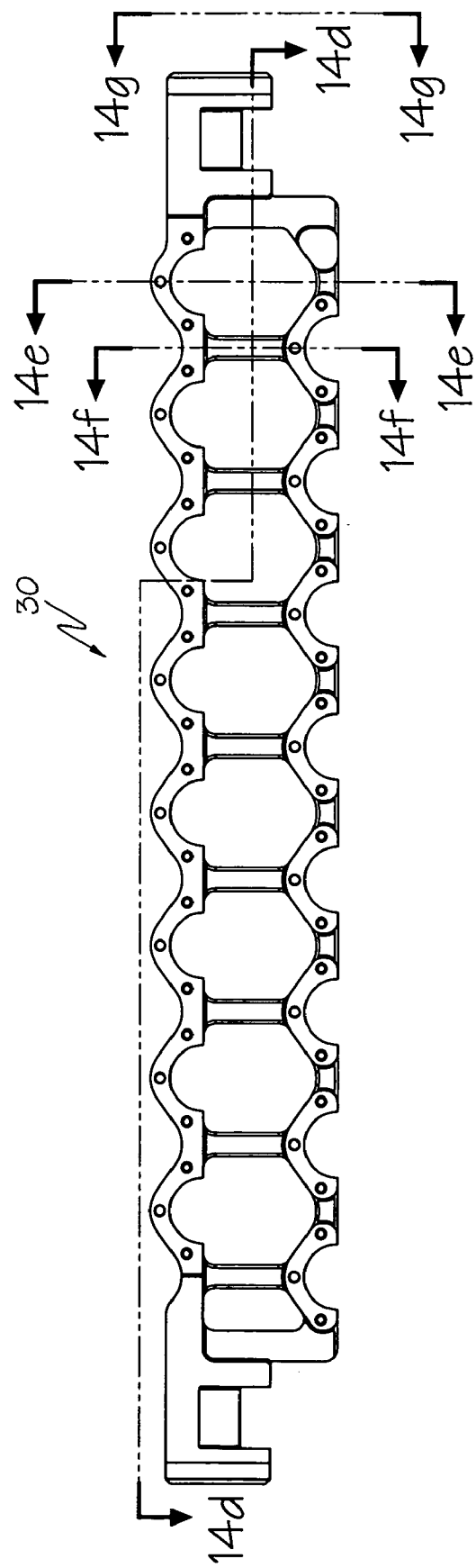
Figure 14D:
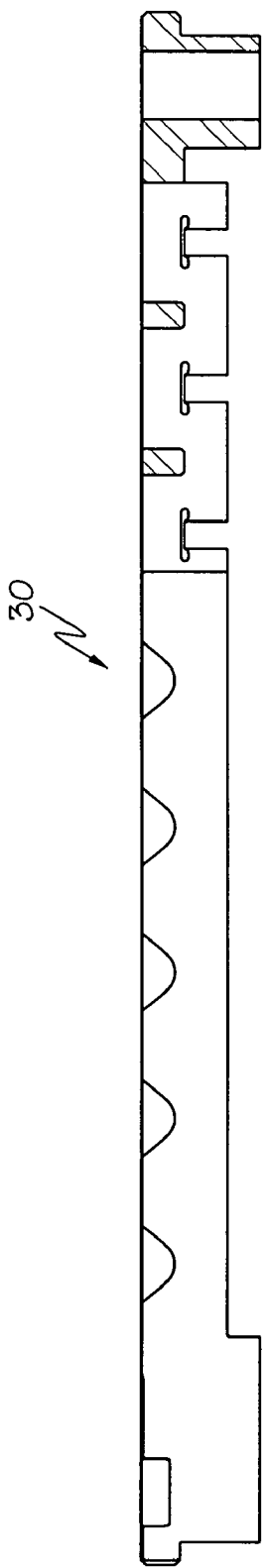
FIG. 14d is view of the right carrier plate taken along A-A of FIG. 14c.
Figure 14G:
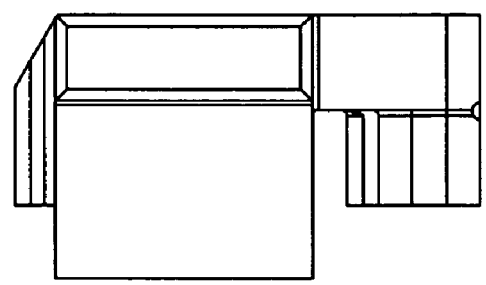
FIG. 14g is a view of the right carrier plate taken along D-D of FIG. 14c.
Figure 14F:
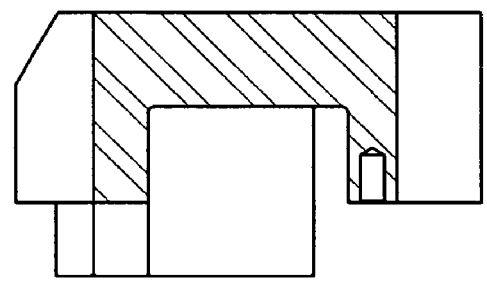
FIG. 14f is a cross sectional view of the right carrier plate taken along C-C of FIG. 14c.
Figure 14E:
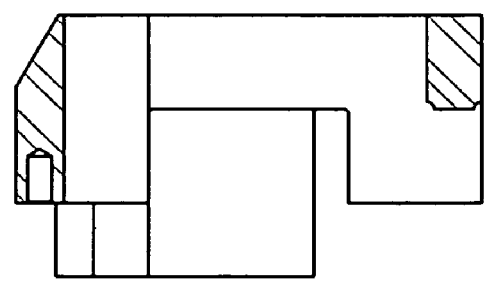
FIG. 14e is a cross sectional view of the right carrier plate taken along B-B of FIG. 14c.
Figures 15A, 15B, 15C:
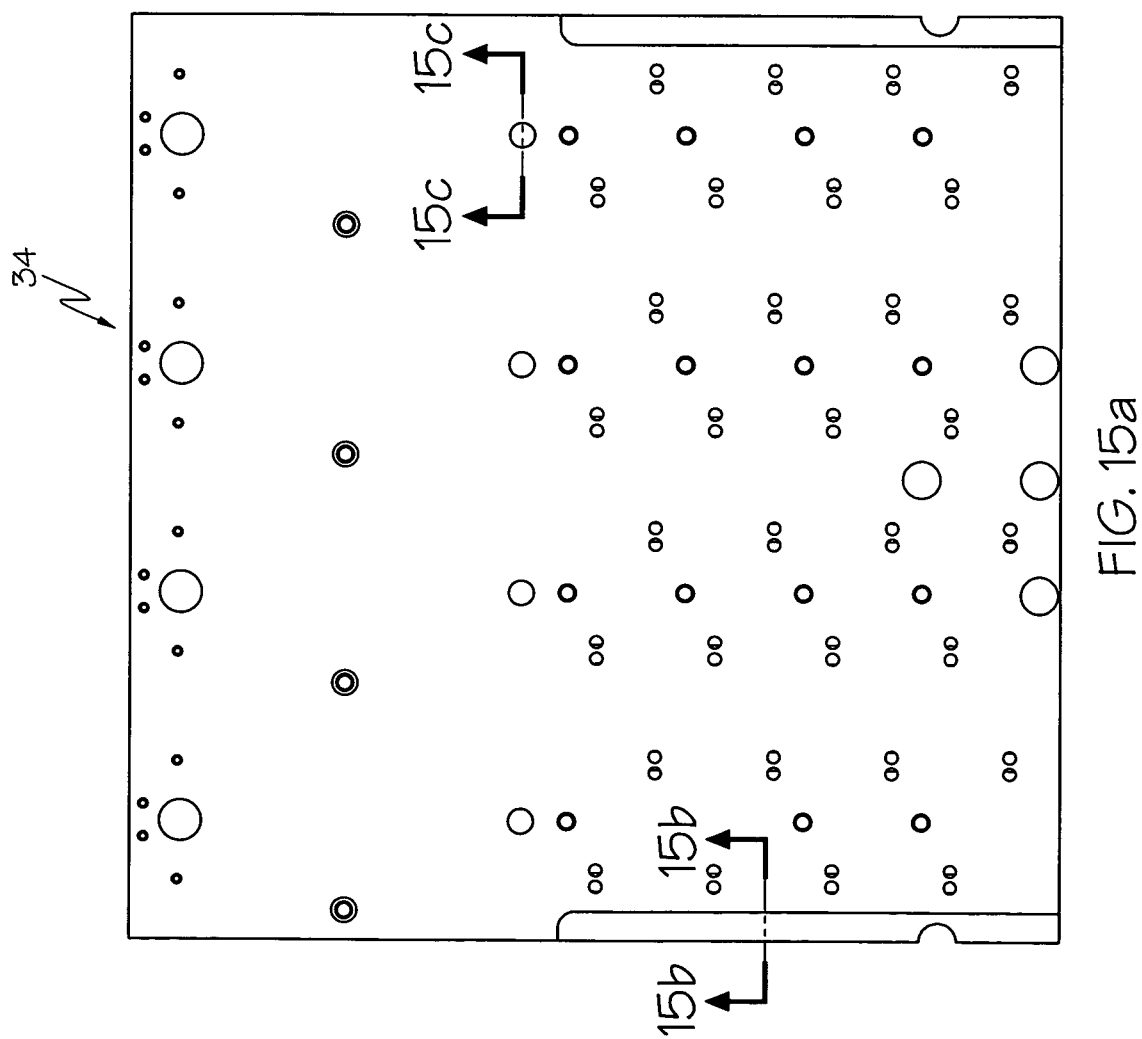
Figure 16:
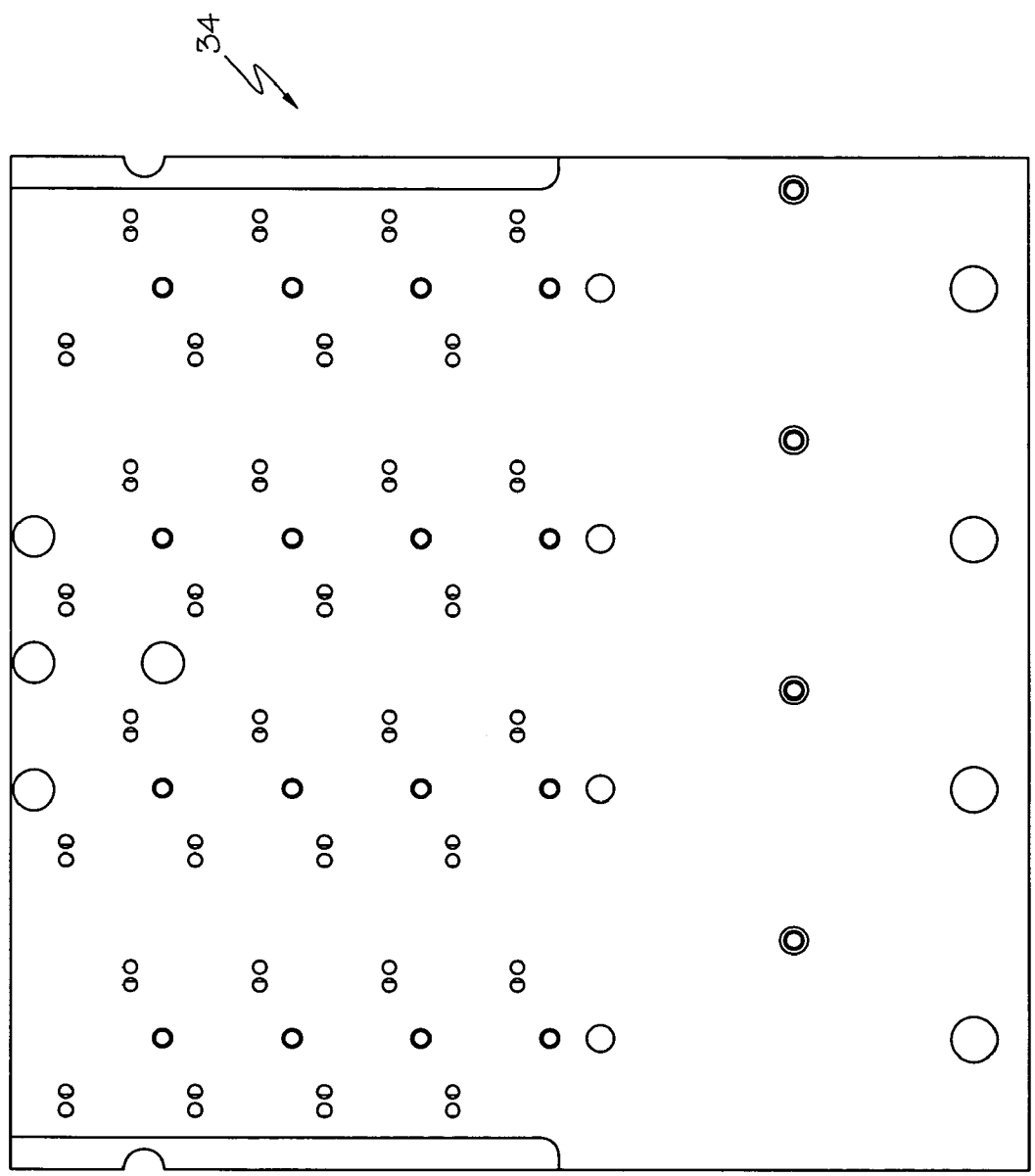
FIG. 16 is a top plan view of an exemplary embodiment of a second half section of the clamp plate of FIG. 1.
Figure 17B:
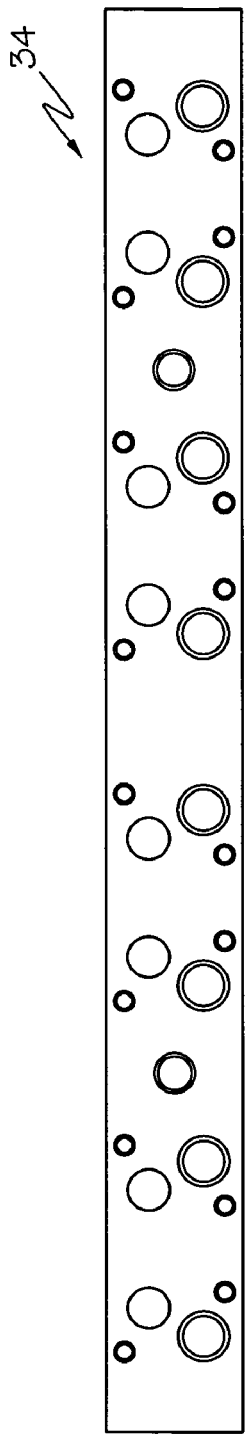
FIG. 17b is a view of the second half section along B-B of FIG. 16.
Figure 17A:
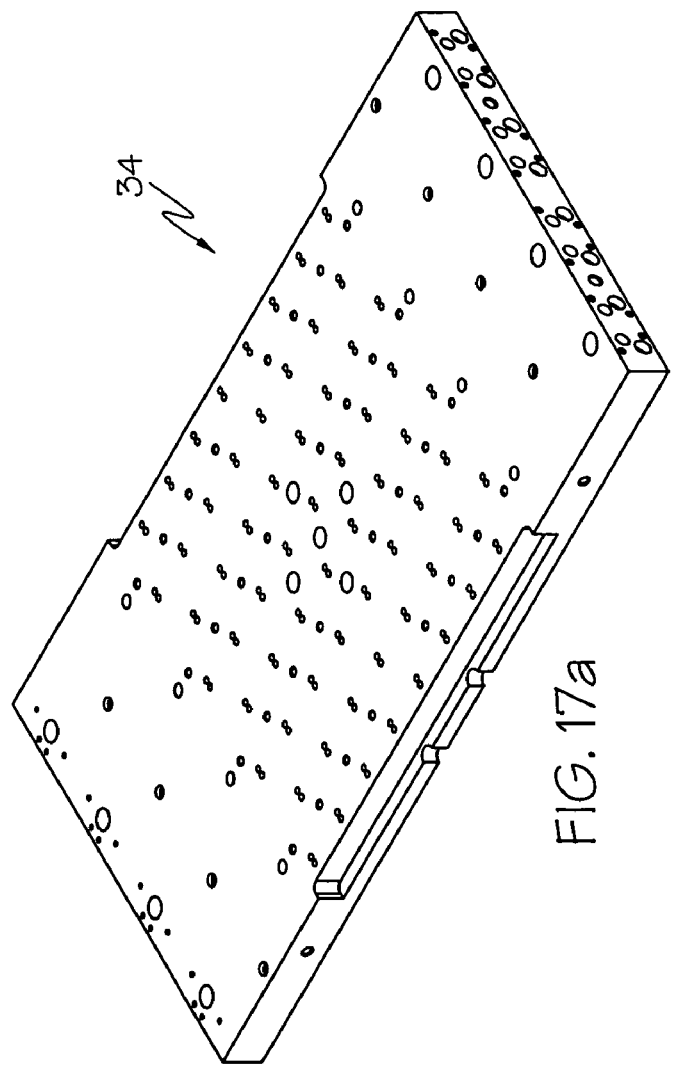
FIG. 17a is a perspective view of the first and second half sections of FIGS. 14 and 15 connected to form the clamp plate shown in FIG. 1.
Figure 19B:
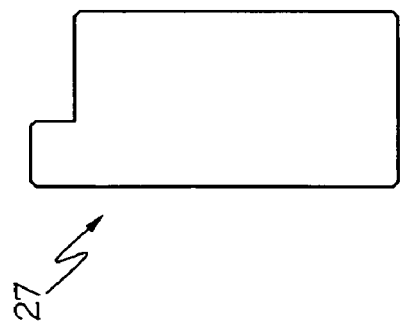
Figure 19D:
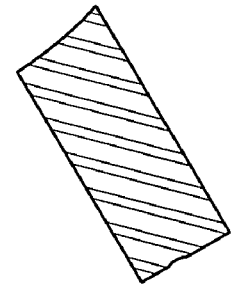
FIG. 19d is a cross section view of the gib taken along A-A of FIG. 19c.
Figure 19A:
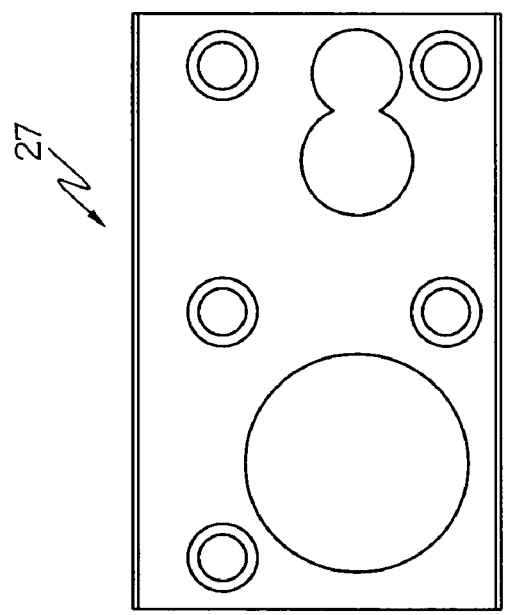
Figure 19C:
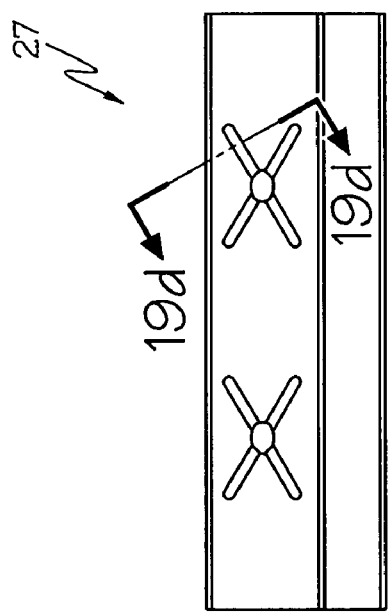
Figure 21C:
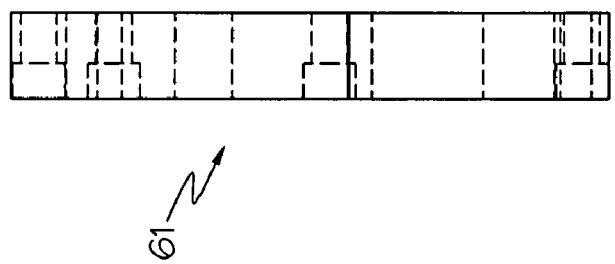
Figure 21A:
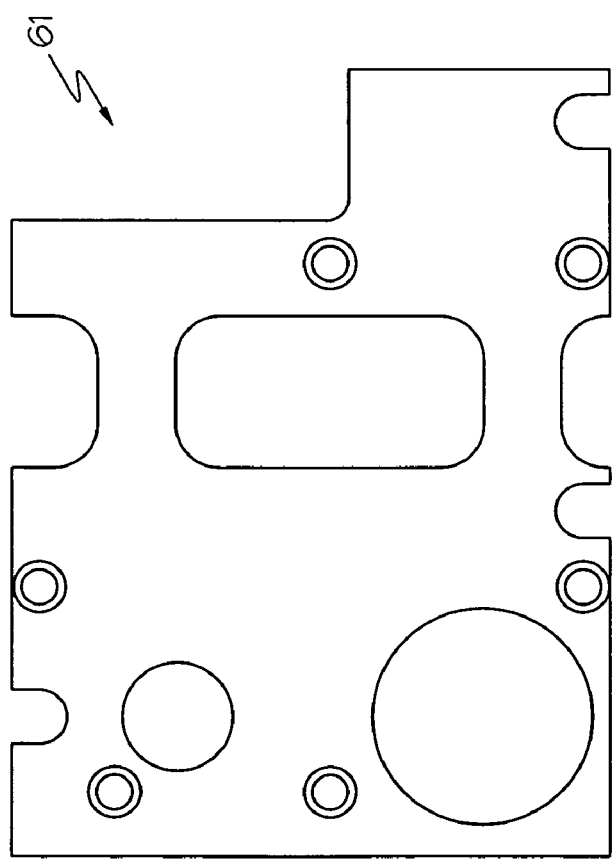
Figure 21B:
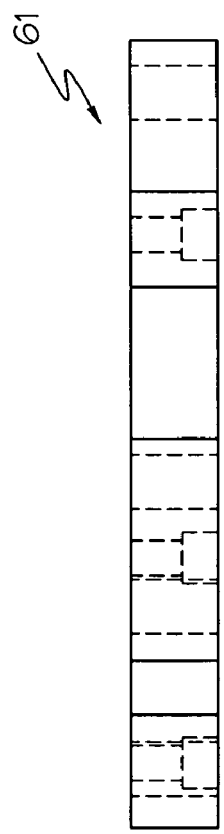

As shown in FIGS. 1 and 7, the preform mold system 10 may include an ejector housing assembly 70 for each core side module 20. Each ejector housing assembly 70 (e.g., first ejector housing assembly 70a, third ejector housing assembly 70c, fourth ejector housing assembly 70d) is connected between the machine ejector plate 42 and the core side clamp plate(s) 34. An end of each ejector housing assembly 70 inserts through a hole in the clamp plate 34 and connects to each preform mold module 20 such that each ejector housing assembly 70 may move its respective preform mold module individually and separately to provide an equal or shorter ejection stroke than the ejector platen 42 on the press of the injection mold machine. This permits the ejection of preforms of different designs (i.e., lengths and finishes) by utilizing the ejection housing assembly 70 for each mold stack-up module to assist the press ejection system in ejecting each preform from the preform molds 67. Also, each ejector housing assembly 70 is easily connected and disconnected via bolt connections from the ejector plate 42 and the core side clamp plate 34 as known to one or ordinary skill in the art to permit simple and efficient change-outs and adaptation to changing production requirements.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A modular preform mold system comprising:
   a core side clamp plate adapted to be connected to a moving platen of an injection mold machine;
   a manifold and valve gate assembly adapted to be connected to a stationary platen of an injection mold machine and in fluid communication with an injector of the injection mold machine; and
   a plurality of preform mold stack-up modules, wherein each of the plurality of preform mold stack-up modules comprises
      a core side module having a plurality of preform mold cores, and
      a respective cavity side module having a plurality of preform mold cavities disposed therein, said respective cavity side module removably engaging the core side module such that each of the plurality of preform mold cores insert into respective ones of the plurality of preform mold cavities to form a plurality of preform molds,
   wherein a first one of the plurality of preform mold stack-up modules comprises a plurality of preform molds having a first preform design, and a second one of the plurality of preform mold stack-up modules comprises a plurality of preform molds having a second preform design,
   wherein the core sides of the plurality of preform mold stack-up modules are removably connected to the core side clamp plate,
   wherein the respective cavity side modules of the plurality of preform mold stack-up modules are removably connected to the manifold and valve gate assembly, placing the plurality of preform molds in fluid communication with the manifold and valve gate assembly, and
   wherein the manifold and valve gate assembly is adapted to uniformly distribute fluidized plastic into the plurality of preform molds in fluid communication with the manifold and valve gate assembly.

2. The mold system of claim 1, wherein the mold system is adjustable such that is enables more than one preform design to be simultaneously formed on a single injection mold machine.

3. The mold system of claim 1, wherein the mold system is adjustable such that from two preforms to one hundred preforms on a single injection mold machine using the same core side clamp plate.

4. The mold system of claim 1, wherein the clamp plate is operable to receive and connect to from one to six core side modules and the manifold and valve gate assembly is operable to receive and connect to from one to six cavity side modules.

5. The mold system of claim 4, wherein each core side module comprises sixteen mold cores extending therefrom and each cavity side module comprises sixteen mold cavities disposed therein corresponding to respective ones of the sixteen mold cores.

6. The mold system of claim 5, wherein the mold system is adjustable such that the mold system is operable to form from sixteen preforms to ninety-six preforms on a single injection mold machine using the same core side clamp plate.

7. The mold system of claim 5, wherein the mold system is adjustable to injection mold from sixteen preforms to ninety-six preforms on a single injection mold machine without having to change out the core side clamp plate.

8. The mold system of claim 1, wherein the mold system is adjustable such that the mold system is operable to form from one to six preform designs and from two to one hundred preforms simultaneously.

9. The mold system of claim 1, wherein the first and second preform designs are distinct preform designs.

10. The mold system of claim 1, wherein each of the plurality of core side modules comprises two rows of eight mold cores, and each cavity side module comprises two row of eight mold cavities corresponding to each respective core.

11. The mold system of claim 10, wherein the mold cores are staggered with respect to each other and the mold cavities are staggered with respect to one another and correspond with the respective cores.

12. The mold system of claim 1, wherein each of the plurality of core side modules comprises two rows of ten mold cores, and each cavity side module comprises two row of ten mold cavities corresponding to each respective core.

13. The modular preform mold system of claim 1, further comprising a plurality of ejector housing assemblies, each one of the plurality of ejector housing assemblies connecting a respective one of the plurality of core side modules to an ejector platen of the injection mold machine and adapted to eject one or more different sized preforms from the plurality of preform molds.

14. The modular preform mold system of claim 13, wherein each of the plurality of ejector housing assemblies is disposed external to the respective one of the plurality of core side modules.

15. The mold system of claim 14, wherein the first and second preform designs are different, and wherein the first and second ejector housing assemblies are operable to eject substantially simultaneously the respective first and second preforms having the respective first and second preform designs.

16. The mold system of claim 14, further comprising a manifold and valve gate assembly operable to receive the first and second cavity side modules and be in fluid communication with each of the plurality of first and second preform molds of the respective first and second preform mold stack-ups, wherein the manifold and valve gate is operable to control the substantially simultaneous injection of fluidized plastic in a uniform flow into each of the plurality of first and second preform molds.

17. The mold system of claim 14, further comprising:
a third core side module comprising a plurality of preform mold cores;
a fourth core side module comprising a plurality of preform mold cores;
a fifth core side module comprising a plurality of preform mold cores;
a sixth core side module comprising a plurality of preform mold cores;
the clamp plate operable to receive one or more of the first, second, third, fourth, fifth, or sixth core side modules, individually or simultaneously;
third, fourth, fifth, and sixth cavity side modules for connecting to a manifold and valve gate system,
wherein the third, fourth, fifth, and sixth cavity side module comprise a plurality of preform mold cavities, and
wherein the third, fourth, fifth, and sixth core side modules and respective third, fourth, fifth, and sixth cavity side modules are operable to matingly engage one another to form respective third, fourth, fifth, and sixth preform mold stack-up modules comprising a plurality of respective third, fourth, fifth, and sixth preform molds; and
third, fourth, fifth, and sixth ejector housing assemblies for connecting respective third, fourth, fifth, and sixth preform mold stack-up modules to an ejector platen and operable to eject a plurality of preforms from the plurality of respective third, fourth, fifth, and sixth preform molds.

18. A modular preform mold system comprising:
a clamp plate for attaching to a moving platen of an injection mold machine;
a first core side module comprising a plurality of preform mold cores and removably connected to the clamp plate;
a second core side module comprising a plurality of preform mold cores and removably connected to the clamp plate;
a manifold and valve gate system adapted to be connected to a stationary platen of an injection mold machine and in fluid communication with an injector of the injection mold machine;
a first cavity side module removably connected to the manifold and valve gate system, the first cavity side module comprising a plurality of preform mold cavities, wherein the first core side module and first cavity side module are matingly engaged to one another to form a first preform mold stack-up module comprising a plurality of first preform molds having a first preform design;
a second cavity side module for connecting to the manifold and valve gate system, the second cavity side module comprising a plurality of preform mold cavities, wherein the second core side module and second cavity side module are matingly engaged to one another to form a second preform mold stack-up module comprising a plurality of second preform molds having a second preform design;
a first ejector housing assembly connecting the first preform mold stack-up module to an ejector platen and ejecting a plurality of first preforms from the plurality of first preform molds; and
a second ejector housing assembly connecting the second preform mold stack-up module to the ejector platen and ejecting a plurality of second preforms from the plurality of second preform molds;
wherein the manifold and valve gate assembly is adapted to uniformly distribute fluidized plastic into the plurality of first preform molds and the plurality of second preform molds.

19. The mold system of claim 18, further comprising:
a third core side module comprising a plurality of preform mold cores and removably connected to the clamp plate;
a fourth core side module comprising a plurality of preform mold cores and removably connected to the clamp plate;
a third cavity side module removably connected to the manifold and valve gate system, the third cavity side module comprising a plurality of preform mold cavities, wherein the third core side module and third cavity side module are matingly engaged to one another to form a third preform mold stack-up module comprising a plurality of third preform molds;
a fourth cavity side module for connecting to the manifold and valve gate system, the fourth cavity side module comprising a plurality of preform mold cavities, wherein the fourth core side module and fourth cavity side module are matingly engaged to one another to form a fourth preform mold stack-up module comprising a plurality of fourth preform molds having a fourth preform design;

a third ejector housing assembly connecting the third preform mold stack-up module to the ejector platen and ejecting a plurality of third preforms from the plurality of third preform molds; and a fourth ejector housing assembly connecting the fourth preform mold stack-up module to the ejector platen and ejecting a plurality of fourth preforms from the plurality of fourth preform molds;

wherein the manifold and valve gate assembly is adapted to uniformly distribute fluidized plastic into the plurality of first, second, third, and fourth preform molds, or any combination thereof simultaneously on the single injection mold machine.

20. A method of modifying a single preform injection mold machine in order to enable the injection mold machine to form an adjustable number of preforms and preform designs, comprising:

attaching a core side clamp plate to a moving platen of a single injection mold machine, the first clamp plate adapted to receive from one to six preform core side modules, individually or simultaneously, wherein each preform core side module comprises a plurality of preform mold cores;

attaching a manifold and valve gate assembly to a stationary platen of the single injection mold machine, the manifold and valve gate assembly adapted to receive from one to six respective preform cavity side modules, individually or simultaneously, wherein each preform cavity side module comprises a plurality of preform mold cavities, and the plurality of mold cores of the preform core side modules are adapted to insert within the plurality of preform mold cavities of the respective preform cavity side modules;

engaging the preform core side modules with the respective, mating preform cavity side modules to form a plurality of preform molds;

wherein the manifold and valve gate assembly is adapted to uniformly distribute fluidized plastic into the preform molds of one to six preform mold designs on the single injection mold machine simultaneously.

* * * * *

UNITED STATES PATENT AND TRADEMARK OFFICE
CERTIFICATE OF CORRECTION

Page 1 of 1

| PATENT NO. | : 7,854,876 B2 |
|---|---|
| APPLICATION NO. | : 11/829326 |
| DATED | : December 21, 2010 |
| INVENTOR(S) | : Karin S. Gaiser |

It is certified that error appears in the above-identified patent and that said Letters Patent is hereby corrected as shown below:

Col. 12, Line 47, "is" should read --the mold system--

Col. 12, Line 51, "such that" should read --in order to mold--

Col. 13, Lines 40-48 have been deleted.

Signed and Sealed this
Thirty-first Day of January, 2012

David J. Kappos
*Director of the United States Patent and Trademark Office*